United States Patent
Burger et al.

(10) Patent No.: US 10,095,519 B2
(45) Date of Patent: Oct. 9, 2018

(54) INSTRUCTION BLOCK ADDRESS REGISTER

(71) Applicant: Microsoft Technology Licensing, LLC, Redmond, WA (US)

(72) Inventors: Douglas C. Burger, Bellevue, WA (US); Aaron L. Smith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 10 days.

(21) Appl. No.: 15/060,483

(22) Filed: Mar. 3, 2016

(65) Prior Publication Data

US 2017/0083340 A1  Mar. 23, 2017

Related U.S. Application Data

(60) Provisional application No. 62/221,003, filed on Sep. 19, 2015.

(51) Int. Cl.
*G06F 9/355* (2018.01)
*G06F 15/80* (2006.01)
(Continued)

(52) U.S. Cl.
CPC ............ *G06F 9/3016* (2013.01); *G06F 9/268* (2013.01); *G06F 9/3004* (2013.01);
(Continued)

(58) Field of Classification Search
CPC .... G06F 9/3016; G06F 9/268; G06F 9/30007; G06F 9/30021; G06F 9/30036;
(Continued)

(56) References Cited

U.S. PATENT DOCUMENTS

| 5,615,350 A | 3/1997 | Hesson |
| 5,790,822 A | 8/1998 | Sheaffer et al. |

(Continued)

FOREIGN PATENT DOCUMENTS

| CN | 101344843 | 1/2009 |
| CN | 102306094 | 1/2012 |

(Continued)

OTHER PUBLICATIONS

Coons et al., "A Spacial Path Scheduling Algorithm for EDGE Architectures," Oct. 20, 2006, p. 129.

(Continued)

*Primary Examiner* — Daniel H Pan
(74) *Attorney, Agent, or Firm* — Klarquist Sparkman, LLP

(57) ABSTRACT

Apparatus and methods are disclosed for controlling instruction flow in block-based processor architectures. In one example of the disclosed technology, an instruction block address register stores an index address to a memory storing a plurality of instructions for an instruction block, the indexed address being inaccessible when the processor is in one or more unprivileged operational modes, one or more execution units configured to execute instructions for the instruction block, and a control unit configured to fetch and decode two or more of the plurality of instructions from the memory based on the indexed address.

22 Claims, 11 Drawing Sheets

(51) Int. Cl.
| | | |
|---|---|---|
| *G06F 12/06* | (2006.01) | |
| *G06F 9/30* | (2018.01) | |
| *G06F 9/32* | (2018.01) | |
| *G06F 9/38* | (2018.01) | |
| *G06F 9/26* | (2006.01) | |
| *G06F 11/36* | (2006.01) | |
| *G06F 12/0862* | (2016.01) | |
| *G06F 9/35* | (2018.01) | |
| *G06F 12/1009* | (2016.01) | |
| *G06F 13/42* | (2006.01) | |
| *G06F 15/78* | (2006.01) | |
| *G06F 9/46* | (2006.01) | |
| *G06F 9/52* | (2006.01) | |
| *G06F 12/0875* | (2016.01) | |
| *G06F 12/0811* | (2016.01) | |
| *G06F 12/0806* | (2016.01) | |

(52) U.S. Cl.
CPC ........ *G06F 9/3005* (2013.01); *G06F 9/30007* (2013.01); *G06F 9/3009* (2013.01); *G06F 9/30021* (2013.01); *G06F 9/30036* (2013.01); *G06F 9/30043* (2013.01); *G06F 9/30058* (2013.01); *G06F 9/30072* (2013.01); *G06F 9/30098* (2013.01); *G06F 9/30101* (2013.01); *G06F 9/30105* (2013.01); *G06F 9/30145* (2013.01); *G06F 9/30167* (2013.01); *G06F 9/30189* (2013.01); *G06F 9/32* (2013.01); *G06F 9/35* (2013.01); *G06F 9/3802* (2013.01); *G06F 9/3804* (2013.01); *G06F 9/3822* (2013.01); *G06F 9/3836* (2013.01); *G06F 9/3848* (2013.01); *G06F 9/3855* (2013.01); *G06F 9/3867* (2013.01); *G06F 9/466* (2013.01); *G06F 9/528* (2013.01); *G06F 11/36* (2013.01); *G06F 11/3648* (2013.01); *G06F 11/3656* (2013.01); *G06F 12/0862* (2013.01); *G06F 12/1009* (2013.01); *G06F 13/4221* (2013.01); *G06F 15/7867* (2013.01); *G06F 15/80* (2013.01); *G06F 15/8007* (2013.01); *G06F 9/3013* (2013.01); *G06F 9/321* (2013.01); *G06F 9/355* (2013.01); *G06F 9/3557* (2013.01); *G06F 9/3859* (2013.01); *G06F 12/0806* (2013.01); *G06F 12/0811* (2013.01); *G06F 12/0875* (2013.01); *G06F 2212/452* (2013.01); *G06F 2212/602* (2013.01); *G06F 2212/604* (2013.01); *G06F 2212/62* (2013.01); *Y02D 10/13* (2018.01); *Y02D 10/14* (2018.01); *Y02D 10/151* (2018.01)

(58) Field of Classification Search
CPC .. G06F 9/3004; G06F 9/30043; G06F 9/3005; G06F 9/30058; G06F 9/30072; G06F 9/3009; G06F 9/30098; G06F 9/30101; G06F 9/30105; G06F 9/30145; G06F 9/30167; G06F 9/30189; G06F 9/32; G06F 9/35; G06F 9/3802; G06F 9/3804; G06F 9/3822; G06F 9/3836; G06F 9/3848; G06F 9/3855; G06F 9/3867; G06F 9/466; G06F 9/528; G06F 11/36; G06F 11/3656; G06F 12/0862; G06F 12/1009; G06F 12/0806; G06F 12/0811; G06F 12/0875; G06F 13/4221; G06F 15/80; G06F 15/8007; G06F 2212/452; G06F 2212/602; G06F 2212/604; G06F 2212/62; G06F 9/3859; G06F 15/7867; G06F 9/3013; G06F 9/30149; G06F 9/321; G06F 9/355; G06F 9/3552; G06F 9/3555; G06F 9/3557; G06F 9/3814; G06F 9/3842; G06F 9/3844; G06F 9/3846; Y02B 60/1225; Y02B 60/1228; Y02B 60/1235; Y02D 10/13; Y02D 10/14; Y02D 10/151
USPC ................ 712/205–207, 210–213, 239, 245
See application file for complete search history.

(56) References Cited

U.S. PATENT DOCUMENTS

| | | |
|---|---|---|
| 5,796,997 A | 8/1998 | Lesartre et al. |
| 5,845,103 A | 12/1998 | Sodani et al. |
| 5,943,501 A | 8/1999 | Burger et al. |
| 6,016,399 A | 1/2000 | Chang |
| 6,044,222 A | 3/2000 | Simons et al. |
| 6,061,776 A | 5/2000 | Burger et al. |
| 6,161,170 A | 12/2000 | Burger et al. |
| 6,164,841 A | 12/2000 | Mattson et al. |
| 6,279,101 B1 | 8/2001 | Witt et al. |
| 6,493,820 B2 | 12/2002 | Akkary et al. |
| 6,513,109 B1 | 1/2003 | Gschwind et al. |
| 6,529,922 B1 | 3/2003 | Hoge |
| 6,732,260 B1* | 5/2004 | Wang .................... G06F 9/3806 712/207 |
| 6,851,043 B1 | 2/2005 | Inoue |
| 6,918,032 B1 | 7/2005 | Abdallah et al. |
| 6,965,969 B2 | 11/2005 | Burger et al. |
| 6,988,183 B1 | 1/2006 | Wong |
| 7,032,217 B2 | 4/2006 | Wu |
| 7,210,127 B1 | 4/2007 | Rangachari |
| 7,299,458 B2 | 11/2007 | Hammes |
| 7,380,038 B2 | 5/2008 | Gray |
| 7,676,650 B2 | 3/2010 | Ukai |
| 7,853,777 B2 | 12/2010 | Jones et al. |
| 7,877,580 B2 | 1/2011 | Eickemeyer et al. |
| 7,917,733 B2 | 3/2011 | Kazuma |
| 7,958,396 B2 | 6/2011 | Chitsaz et al. |
| 8,055,881 B2 | 11/2011 | Burger et al. |
| 8,055,885 B2 | 11/2011 | Nakashima |
| 8,127,119 B2 | 2/2012 | Burger et al. |
| 8,180,997 B2 | 5/2012 | Burger et al. |
| 8,201,024 B2 | 6/2012 | Burger et al. |
| 8,250,555 B1 | 8/2012 | Lee et al. |
| 8,321,850 B2 | 11/2012 | Bruening et al. |
| 8,433,885 B2 | 4/2013 | Burger et al. |
| 8,447,911 B2 | 5/2013 | Burger et al. |
| 8,464,002 B2 | 6/2013 | Burger et al. |
| 8,464,271 B2 | 6/2013 | Eichenberger et al. |
| 8,510,596 B1 | 8/2013 | Gupta et al. |
| 8,612,726 B2 | 12/2013 | Sharawi et al. |
| 8,817,793 B2 | 8/2014 | Mushano |
| 9,021,241 B2 | 4/2015 | Burger et al. |
| 9,043,769 B2 | 5/2015 | Vorbach |
| 9,053,292 B2 | 6/2015 | Abdallah |
| 2003/0101208 A1 | 5/2003 | Chauvel et al. |
| 2005/0076194 A1 | 4/2005 | Kanapathippillai et al. |
| 2006/0041875 A1 | 2/2006 | Peri et al. |
| 2006/0242391 A1* | 10/2006 | Elwood .............. G06F 9/30149 712/238 |
| 2007/0050557 A1 | 3/2007 | Ferren et al. |
| 2007/0157006 A1 | 7/2007 | Jourdan et al. |
| 2007/0192540 A1 | 8/2007 | Gara et al. |
| 2007/0255980 A1 | 11/2007 | Endo et al. |
| 2008/0109668 A1 | 5/2008 | Atkinson |
| 2008/0235499 A1 | 9/2008 | Togawa |
| 2009/0013135 A1 | 1/2009 | Burger et al. |
| 2009/0013160 A1 | 1/2009 | Burger et al. |
| 2009/0138681 A1* | 5/2009 | Saha .................... G06F 9/3004 712/216 |
| 2009/0150657 A1 | 6/2009 | Gschwind et al. |
| 2010/0146209 A1 | 6/2010 | Burger et al. |
| 2010/0325395 A1 | 12/2010 | Burger et al. |
| 2011/0060889 A1 | 3/2011 | Burger et al. |
| 2011/0072239 A1 | 3/2011 | Burger et al. |

(56) References Cited

U.S. PATENT DOCUMENTS

| | | | |
|---|---|---|---|
| 2011/0078424 | A1 | 3/2011 | Boehm et al. |
| 2011/0219222 | A1 | 9/2011 | Eichenberger et al. |
| 2011/0238953 | A1 | 9/2011 | Metsugi et al. |
| 2012/0017069 | A1 | 1/2012 | Bourd et al. |
| 2012/0079102 | A1 | 3/2012 | Damodaran et al. |
| 2012/0079488 | A1 | 3/2012 | Phillips et al. |
| 2012/0124345 | A1 | 5/2012 | Denman et al. |
| 2012/0204004 | A1 | 10/2012 | Chen |
| 2012/0303933 | A1 | 11/2012 | Manet et al. |
| 2012/0311306 | A1 | 12/2012 | Mushano |
| 2013/0024676 | A1 | 1/2013 | Glew et al. |
| 2013/0086370 | A1* | 4/2013 | Burger ............... G06F 9/45516 712/239 |
| 2013/0198499 | A1 | 8/2013 | Dice et al. |
| 2013/0246682 | A1 | 9/2013 | Jandhyam |
| 2014/0033217 | A1 | 1/2014 | Vajda et al. |
| 2014/0075144 | A1* | 3/2014 | Sanders ................ G06F 12/02 711/170 |
| 2014/0082327 | A1 | 3/2014 | Ghose |
| 2014/0136822 | A1 | 5/2014 | Suggs et al. |
| 2014/0181475 | A1 | 6/2014 | Abdallah |
| 2014/0189287 | A1 | 7/2014 | Plotnikov |
| 2014/0201507 | A1 | 7/2014 | Jayaseelan et al. |
| 2014/0281389 | A1 | 9/2014 | Loktyukhin et al. |
| 2014/0281402 | A1 | 9/2014 | Comparan et al. |
| 2014/0281424 | A1 | 9/2014 | Bobba et al. |
| 2014/0331236 | A1 | 11/2014 | Mitra et al. |
| 2014/0372736 | A1 | 12/2014 | Greenhalgh |
| 2015/0067662 | A1 | 3/2015 | Palalau |
| 2015/0095628 | A1 | 4/2015 | Yamada et al. |
| 2015/0100757 | A1 | 4/2015 | Burger et al. |
| 2015/0127928 | A1 | 5/2015 | Burger et al. |
| 2015/0199199 | A1 | 7/2015 | Burger et al. |
| 2016/0179546 | A1 | 6/2016 | Yamada et al. |
| 2016/0378479 | A1 | 12/2016 | Burger et al. |
| 2016/0378483 | A1 | 12/2016 | Burger et al. |
| 2016/0378484 | A1 | 12/2016 | Burger et al. |
| 2016/0378488 | A1 | 12/2016 | Burger et al. |
| 2016/0378491 | A1 | 12/2016 | Burger et al. |
| 2016/0378493 | A1 | 12/2016 | Burger et al. |
| 2016/0378496 | A1 | 12/2016 | Gray et al. |
| 2016/0378499 | A1 | 12/2016 | Burger et al. |
| 2016/0378661 | A1 | 12/2016 | Gray et al. |
| 2017/0083343 | A1 | 3/2017 | Burger et al. |

FOREIGN PATENT DOCUMENTS

| | | |
|---|---|---|
| CN | 102306094 A | 1/2012 |
| EP | 0 992 894 A1 | 4/2000 |
| EP | 1 039 374 A2 | 9/2000 |
| WO | WO 2004/001587 | 12/2003 |
| WO | WO 2009/006607 | 1/2009 |
| WO | WO 2011/031361 | 3/2011 |
| WO | WO 2013/081556 | 6/2013 |
| WO | WO 2013/095401 | 6/2013 |
| WO | WO-2014/193878 A1 | 12/2014 |

OTHER PUBLICATIONS

International Search Report and Written Opinion for PCT/US2016/051415, dated Dec. 16, 2016, 10 pages.

Pricopi et al., "Bahurupi: A Polymorphic Heterogeneous Multi-Core Architecture," ACM Trans. Architec. Code Optim. 8, 4, Article 22 (Jan. 2012), 21 pages.

Robatmili et al., "Strategies for Mapping Dataflow Blocks to Disributed Hardware," In 41st IEEE/ACM International Symposium on IEEE, Nov. 8, 2008, pp. 23-34.

August, et al., "Architectural Support for Compiler-Synthesized Dynamic Branch Prediction Strategies: Rationale and Initial Results", In Proceedings of Third International Symposium on High-Performance Computer Architecture, Feb. 1, 1997, pp. 84-93.

Bouwens et al., "Architecture Enhancements for the ADRES Coarse-Grained Reconfigurable Array," High Performance Embedded Architectures and Compilers, Springer Berlin Heidelberg, 2008, pp. 66-81.

Burger et al., "Design and Implementation of the TRIPS EDGE Architecture," In Proceedings of the 32nd Annual International Symposium on Computer Architecture, Jun. 4, 2005, pp. 1-41.

Burger et al., "Scaling to the End of Silicon with EDGE Architectures," In Proceedings of Computer, vol. 37, Issue 7, Jul. 1, 2004, pp. 44-55.

Chiu et al., "Hyperscalar: A Novel Dynamically Reconfigurable Multi-core Architecture", In Proceedings of 39th International Conference on Parallel Processing, Sep. 13, 2010, pp. 277-286.

Coons et al., "A Spatial Path Scheduling Algorithm for EDGE Architectures," In Proceedings of the 12th International Conference on Architectural Support for Programming Languages and Operating Systems (ASPLOS), Oct. 12, 2006, 12 pages.

Desikan et al., "Scalable Selective Re-Execution for EDGE Architectures," In Proceedings of the 11th International Conference on Architectural Support for Programming Languages and Operating Systems, Oct. 9, 2004, 13 pages.

"Explicit Data Graph Execution," Retrieved on: Aug. 6, 2015, Available at: https://en.wikipedia.org/wiki/Explicit_Data_Graph_Execution.

Fallin, et al., "The Heterogeneous Block Architecture," In Proceedings of 32nd IEEE International Conference on Computer Design, Oct. 19, 2014, pp. 1-8.

Gebhart et al., "An Evaluation of the TRIPS Computer System," In Proceedings of the 14th international conference on Architectural support for programming languages and operating systems, Mar. 7, 2009, 12 pages.

Govindan, "E3:Energy-Efficient EDGE Architectures," In Dissertation, Aug. 2010, 244 pages.

Gray and Smith, "Towards an Area-Efficient Implementation of a High ILP Edge Soft Processor: Comparing Out-of-Order Dataflow Instruction Scheduler Designs," poster temporarily on display during The 22nd IEEE International Symposium on Field-Programmable Custom Computing Machines May 11-13, 2014, Boston, Massachusetts (poster on display for approximately 1-2 hours, and less than one day, May 2014).

Huang et al., "Compiler-Assisted Sub-Block Reuse," Retrieved on: Apr. 9, 2015; Available at: http://citeseerx.ist.psu.edu/viewdoc/download?doi=10.1.1.33.155&rep=rep1&type=pdf (also published as Huang & Lilja, "Compiler-Assisted Sub-Block Reuse," UMSI ResearchReport/University of Minnesota Supercomputer Institute 73 (2000)).

Huang, "Improving Processor Performance Through Compiler-Assisted Block Reuse," In Doctoral Dissertation, May 2000, 125 pages.

Kavi, et al., "Concurrency, Synchronization, Speculation—the Dataflow Way", In Journal of Advances in Computers, vol. 96, Nov. 23, 2013, pp. 1-41.

Keckler et al., "Tera-Op Reliable Intelligently Adaptive Processing System (Trips)," In AFRL-IF-WP-TR-2004-1514, document dated Apr. 2004, 29 Pages.

Kim et al., "Composable Lightweight Processors," 13 pages (document also published as Kim, et al., "Composable lightweight processors," 40th Annual IEEE/ACM International Symposium on Microarchitecture (MICRO 2007), 2007, pp. 381-394.

Kozumplik, et al., "TRIPS to the Semantic EDGE," Retrieved on: Sep. 22, 2015, Available at: http://vbn.aau.dk/ws/files/61072300/1212050422.pdf.

Li et al., "Code Layout Optimization for Defensiveness and Politeness in Shared Cache," 11 pages, (also published as Li, et al, "Code Layout Optimization for Defensiveness and Politeness in Shared Cache," 43rd International Conference on Parallel Processing (ICPP), IEEE, 2014, pp. 151-161.

Maher, "Atomic Block Formation for Explicit Data Graph Execution Architectures," In Dissertation of Doctor of Philosophy, Aug. 2010, 185 pages.

McDonald et al., "TRIPS Processor Reference Manual," In Technical Report TR-05-19, document marked Mar. 10, 2005, 194 pages.

Mei et al., "ADRES: An Architecture with Tightly Coupled VLIW Processor and Coarse-Grained Reconfiguration Matrix," 10 pages,

(56) References Cited

OTHER PUBLICATIONS (also published as Mei, et al. "ADRES: An architecture with tightly coupled VLIW processor and coarse-grained reconfigurable matrix," In Proceedings of 13th International Conference on Field-Programmable Logic and Applications, Sep. 2003, pp. 61-70.

Melven et al., "Enhancing Instruction Scheduling with a Block-Structured ISA," International Journal of Parallel Programming, vol. 23, No. 3, Jun. 1995, 23 pages.

Microsoft Research, "E2," document downloaded on Apr. 10, 2015 from http://research.microsoft.com/en-us/projects/e2/.

Nagarajan et al., "Critical Path Analysis of the TRIPS Architecture," In IEEE International Symposium on Performance Analysis of Systems and Software, Mar. 19, 2006, 11 pages.

Pengfei et al., "M5 Based EDGE Architecture Modeling", In Proceedings of IEEE International Conference on Computer Design, Oct. 3, 2010, pp. 289-296.

Putnam et al., "Dynamic Vectorization in the E2 Dynamic Multicore Architecture," 6 pages (also published as Putnam, et al., "Dynamic vectorization in the E2 dynamic multicore architecture," ACM SIGARCH Computer Architecture News, 2011, pp. 27-32.

Robatmili et al., "How to Implement Effective Prediction and Forwarding for Fusable Dynamic Multicore Architectures," In Proceedings of the 19th IEEE International Symposium on High-Performance Computer Architecture, Feb. 23, 2013, 12 pages.

Sankaralingam et al., "Distributed Microarchitectural Protocols in the TRIPS Prototype Processor," 12 pages (also published as "Distributed Microarchitectural Protocols in the TRIPS Prototype Processor," Proceedings of 39th Annual IEEE/ACM International Symposium on Microarchitecture, pp. 480-491 (2006)).

Sankaralingam et al., "Exploiting ILP, TLP, and DLP with Polymorphous TRIPS Architecture," In Proceedings of the 30th Annual International Symposium on Computer Architecture, Jun. 9, 2003, 12 pages.

Sankaralingam, "Polymorphous Architectures: A Unified Approach for Extracting Concurrency of Different Granularities," In Doctoral Dissertation of Philosophy, Aug. 2007, 276 pages.

Sankaralingam, et al., "TRIPS: A Polymorphous Architecture for Exploiting ILP, TLP, and DLP," In Journal of ACM Transactions on Architecture and Code Optimization, vol. 1, No. 1, Mar. 2004, pp. 62-93.

Sethumadhavan et al., "Design and Implementation of the TRIPS Primary Memory System," In Proceedings of International Conference on Computer Design, Oct. 1, 2006, 7 pages.

Smith et al., "Compiling for EDGE Architectures," In Proceedings of International Symposium on Code Generation and Optimization, Mar. 26, 2006, 11 pages.

Smith et al., "Dataflow Predicatio," In Proceedings of 39th Annual IEEE/ACM International Symposium on Microarchitecture, Dec. 9, 2006, 12 pages.

Smith, "Explicit Data Graph Compilation," In Thesis, Dec. 2009, 201 pages.

Smith, "TRIPS Application Binary Interface (ABI) Manual," Technical Report TR-05-22, Department of Computer Sciences, The University of Texas at Austin, Technical Report TR-05-22, document marked Oct. 10, 2006, 16 pages.

Bush et al., "Evaluation and Optimization of Signal Processing Kernels on the TRIPS Architecture", In Proceedings of 4th Annual Workshop on Optimizations for DSP and Embedded Systems, Mar. 2006, pp. 1-10.

Duong, et al., "Compiler-Assisted, Selective Out-of-Order Commit", In Journal of IEEE Computer Architecture Letters, vol. 12, Issue 1, Jan. 2013, 3 pages.

Duric et al., "Dynamic-Vector Execution on a General Purpose EDGE Chip Multiprocessor," In Proceedings of the 2014 International Conference on Embedded Computers Syhstems: Architectures, Modeling, and Simulation (SAMOS XIV), Jul. 14-17, 2014, 8 pages.

Duric et al., "EVX: Vector Execution on Low Power EDGE Cores," Design, Automation and Test in European Conference and Exhibition, Mar. 24-28, 2014, 4 pages.

Duric et al., "ReCompAc: Reconfigurable compute accelerator," IEEE 2013 International Conference on Reconfigurable Computing and FPGAS (Reconfig), Dec. 9, 2013, 4 pages.

Gaudiot, et al., "The Sisal Model of Functional Programming and its Implementation", In Proceedings of Second Aizu International Symposium on Parallel Algorithms/Architectures Synthesis, Mar. 17, 1997, pp. 1-12.

González, et al., "Dependence Speculative Multithreaded Architecture", In Technical Report, Retrieved on: Jul. 1, 2015, 22 pages.

Govindan et al., "Scaling Power and Performance via Processor Composability," IEEE Transaction on Computers, No. 1, Aug. 2014, 14 pages.

Govindaraju et al., "DySER: Unifying Functionality and Parallelism Specialization for Energy-Efficient Computing," IEEE Micro, IEEE Service Center, Sep. 1, 2012, 14 pages.

Gulati et al., "Multitasking Workload Scheduling on Flexible Core Chip Multiprocessors," In Proceedings of the Computer Architecture News, vol. 36, Issue 2, May 2008, 10 pages.

Gupta, "Design Decisions for Tiled Architecture Memory Systems," document marked Sep. 18, 2009, available at: http://cseweb.ucsd.edu/~a2gupta/uploads/2/2/7/3/22734540/researchexam.paper.pdf, 14 pages.

Hammond et al., "Programming with Transactional Coherence and Consistency (TCC)," ACM SIGOPS Operating Systems Review. vol. 38. No. 5. ACM, 2004, 13 pages.

Hammond et al., "Transactional Coherence and Consistency: Simplifying Parallel Hardware and Software," IEEE Computer Society, pp. 92-103, 2004.

Hammond et al., "Transactional Memory Coherence and Consistency," ACM SIGARCH Computer Architecture News. vol. 32. No. 2. IEEE Computer Society, 2004, 12 pages.

Hao et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.

Ipek et al., "Core Fusion: Accommodating Software Diversity in Chip Multiprocessors", In Proceedings of the 34th annual international symposium on Computer architecture, Jun. 9, 2007, 12 pages.

Liu, "Hardware Techniques to Improve Cache Efficiency", In Dissertation of the University of Texas at Austin, May 2009, 189 pages.

Maher et al., "Merging Head and Tail Duplication for Convergent Hyperblock Formation," In Annual IEEE/ACM International Symposium on Microarchitecture, Dec. 2006, 12 pages.

McDonald et al., "Characterization of TCC on Chip-Multiprocessors," Parallel Architectures and Compilation Techniques, 2005. PACT 2005. 14th International Conference on. IEEE, 2005, 12 pages.

Munshi, et al., "A Parameterizable SIMD Stream Processor", In Proceedings of Canadian Conference on Electrical and Computer Engineering, May 1, 2005, pp. 806-811.

Nagarajan et al., "A Design Space Evaluation of Grid Processor Archietectures," In Proceedings of the 24th annual ACM/IEEE international symposium on Microarchitecture, Dec. 1, 2001, pp. 40-51.

Nagarajan et al., "Static Placement, Dynamic Issue (SPDI) Scheduling for EDGE Architectures," In Proceedings of the 13th International Conference on Parallel Architecture and Compilation Techniques, Sep. 29, 2004, 11 pages.

Park et al., "Polymorphic Pipeline Array: A flexible multicore accelerator with virtualized execution for mobile multimedia applications," 42nd Annual IEEE/ACM International Symposium on Microarchitecture, Dec. 12, 2009, 11 pages.

Pickett, "Software Method Level Speculation for Java", In Thesis, Apr. 2012, 236 pages.

Pierce et al., "Wrong-Path Instruction Prefetching", In Proceedings of the 29th Annual IEEE/ACM International Symposium on Microarchitecture, Dec. 2, 1996, pp. 1-17.

Robatmili et al., "Exploiting Criticality to Reduce Bottlenecks in Distributed Uniprocessors," 17th IEEE International Symposium on High-Performance Computer Architecture (HPCA-17), Feb. 2011, 12 pages.

Roesner, "Counting Dependence Predictors," In Undergraduate Honors Thesis, May 2, 2008, 25 pages.

(56) References Cited

OTHER PUBLICATIONS

Sibi et al., "Scaling Power and Performance via Processor Composability," University of Texas at Austin technical report No. TR-10-14 (2010), 20 pages.
Souza et al., "Dynamically Scheduling VLIW Instructions", In Journal of Parallel and Distributed Computing, vol. 60, Jul. 2000, pp. 1480-1511.
Tamches et al., "Dynamic Kernel Code Optimization," In Workshop on Binary Translation, 2001, 10 pages.
Wu et al., "Block Based Fetch Engine for Superscalar Processors", In Proceedings of the 15th International Conference on Computer Applications in Industry and Engineering, Nov. 7, 2002, 4 pages.
Zmily, "Block-Aware Instruction Set Architecture", In Doctoral Dissertation, Jun. 2007, 176 pages.
Zmily et al., "Block-Aware Instruction Set Architecture", In Proceedings of ACM Transactions on Architecture and Code Optimization, vol. 3, Issue 3, Sep. 2006, pp. 327-357.
Zmily, et al., "Improving Instruction Delivery with a Block-Aware ISA", In Proceedings of 11th International Euro-Par Conference on Parallel Processing, Aug. 30, 2005, pp. 530-539.
Appelbe et al., "Hoisting Branch Conditions—Improving Super-Scalar Processor Performance", College of Computer, School of Electrical and Computer Engineering George Institute of Technology, Atlanta, GA, pp. 304-317.
International Preliminary Report on Patentability Issued in PCT Application No. PCT/US2016/051415 (dated Dec. 20, 2017), pp. 1-6.
PCT Chapter II Demand for International Preliminary Examination under Article 34 submitted to the European Patent Office dated Mar. 20, 2017, for PCT/US2016/051415, pp. 1-3.
Written Opinion of the International Preliminary Examining Authority dated Aug. 23, 2017, for PCT/US2016/051415, pp. 1-5.

\* cited by examiner

FIG. 8

810
```
void f(); void g(); void h();
typedef void (*PFN)();

void x() {
  int a, z;
  PFN jump_table[] = { f, g, h };
…
  const int num_func = sizeof(jump_table)/sizeof(jump_table[0]);

for (int i = 0; i <= num_func; ++i) {
    ++a;
    if (a < 97)
      a = z + 1;
    else
      a = z - 64 + i;

(*jump_table[i])();
  }
}
```

820
```
E:  ADDI   #0      R1                  // i=0;
F:  BRO    L0
L0:
0:  READL  R1      T[2R]               // read i
1:  ADDI   #1      R2      T[3L]       // ++a;
2:  GENS   #97     T[3R]               // generate constant 97
3:  TLTI           T[4R]   T[5R]       // a<97 ?
4:  BRO_T  L1
5:  BRO_F  L2
L1:
0:  READL  R3      T[1R]               // read z
1:  ADD    #1      R2                  // a=z+1
2:  BRO    L3
L2:
0:  READL  R3      T[2L]               // read z
1:  READL  R1      T[3R]               // read i
2:  SUB    #64     T[3L]               // z-64
3:  ADD            R2                  // a=(z-64)+i
4:  BRO    L3
L3:
0:  READL  R4      T[3L]               // read jump_table
1:  READL  R1      T[3R]   T[6L]       // read i
2:  READL  R5      T[6R]               // read num_func
3:  ADD            T[4R]               // jump_table+i
4:  LW             T[5R]               // *jump_table[i]
5:  CALL_F                             // call *jump_table[i]
6:  TLTE   T[7P]                       // test for loop condition
7:  BRO_T  L0                          // branch to top of for loop
8:  ....                               // remainder of code in function x()....
```

INSTRUCTION BLOCK ADDRESS REGISTER

CROSS-REFERENCE TO RELATED APPLICATIONS

This application claims the benefit of U.S. Provisional Patent Application No. 62/221,003, entitled "BLOCK-BASED PROCESSORS," filed Sep. 19, 2015, which application is incorporated herein by reference in its entirety.

BACKGROUND

Microprocessors have benefited from continuing gains in transistor count, integrated circuit cost, manufacturing capital, clock frequency, and energy efficiency due to continued transistor scaling predicted by Moore's law, with little change in associated processor Instruction Set Architectures (ISAs). However, the benefits realized from photolithographic scaling, which drove the semiconductor industry over the last 40 years, are slowing or even reversing. Reduced Instruction Set Computing (RISC) architectures have been the dominant paradigm in processor design for many years. Out-of-order superscalar implementations have not exhibited sustained improvement in area or performance. Accordingly, there is ample opportunity for improvements in processor ISAs to extend performance improvements.

SUMMARY

Methods, apparatus, and computer-readable storage devices are disclosed for configuring, operating, and compiling code for, block-based processor architectures (BB-ISAs), including explicit data graph execution (EDGE) architectures. The described techniques and tools for solutions for, e.g., improving processor performance and/or reducing energy consumption can be implemented separately, or in various combinations with each other. As will be described more fully below, the described techniques and tools can be implemented in a digital signal processor, microprocessor, application-specific integrated circuit (ASIC), a soft processor (e.g., a microprocessor core implemented in a field programmable gate array (FPGA) using reconfigurable logic), programmable logic, or other suitable logic circuitry. As will be readily apparent to one of ordinary skill in the art, the disclosed technology can be implemented in various computing platforms, including, but not limited to, servers, mainframes, cellphones, smartphones, PDAs, handheld devices, handheld computers, PDAs, touch screen tablet devices, tablet computers, wearable computers, and laptop computers.

In some examples of the disclosed technology, a processor core is configured to fetch and execute instruction blocks with a plurality of execution units. A processor control unit includes at least one instruction block address register (IBAR) that indexes a location for fetching a variable-size instruction block, the instruction block address register being implicitly written by executing a branch instruction with one of the execution units. The instruction block address register is not visible from one or more operating modes of the block-based processor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

BRIEF DESCRIPTION OF THE DRAWINGS

FIG. 8 illustrates source code and assembly code for a block-based processor, as can be used in certain examples of the disclosed technology.

DETAILED DESCRIPTION

I. General Considerations

Figure 1:
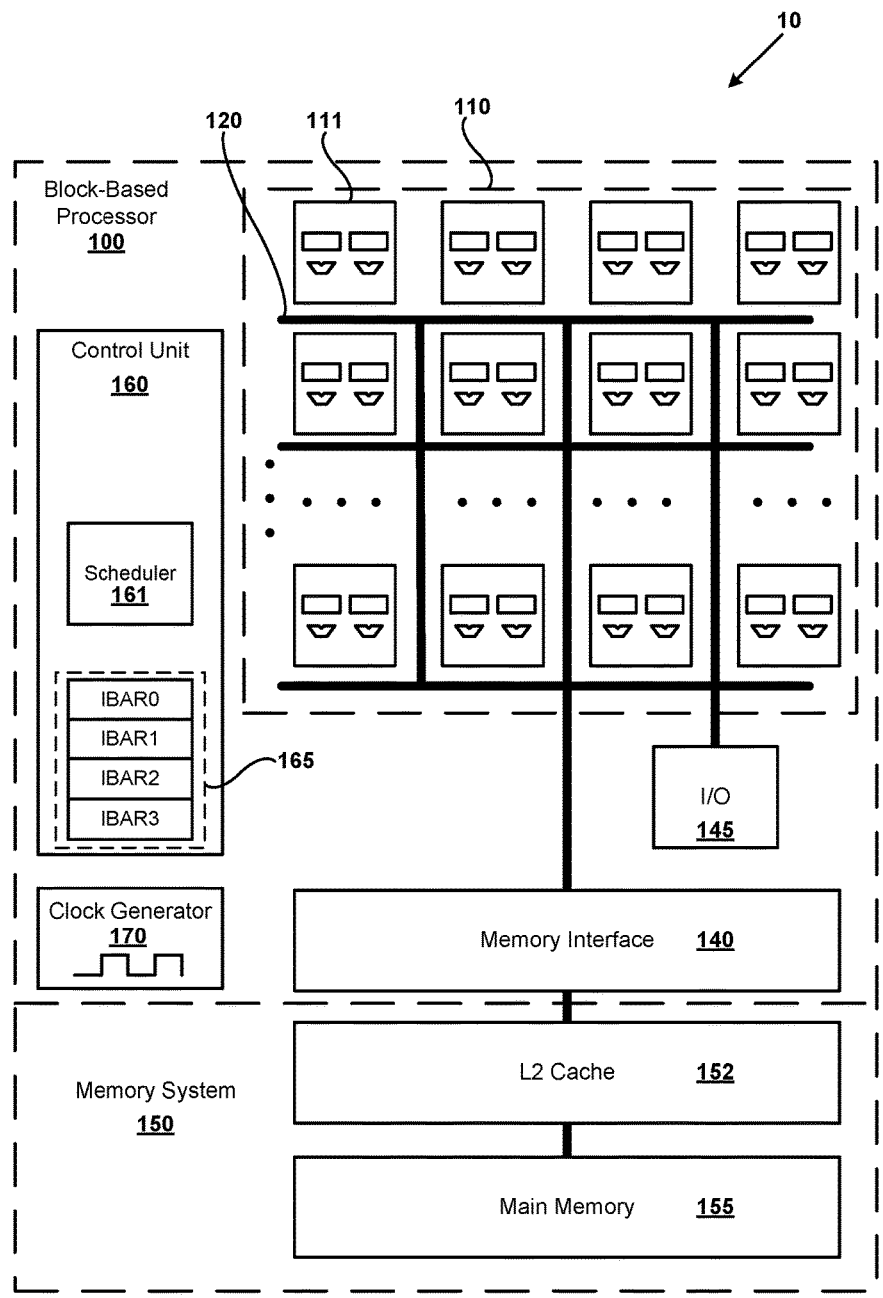
FIG. 1 illustrates a block-based processor core, as can be used in some examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., with general-purpose and/or block based processors executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technologies

Superscalar out-of-order microarchitectures employ substantial circuit resources to rename registers, schedule instructions in dataflow order, clean up after miss-speculation, and retire results in-order for precise exceptions. This includes expensive circuits, such as deep, many-ported register files, many-ported content-accessible memories (CAMs) for dataflow instruction scheduling wakeup, and many-wide bus multiplexers and bypass networks, all of which are resource intensive. For example, FPGA-based implementations of multi-read, multi-write RAMs typically require a mix of replication, multi-cycle operation, clock doubling, bank interleaving, live-value tables, and other expensive techniques.

The disclosed technologies can realize performance enhancement through application of techniques including high instruction-level parallelism (ILP), out-of-order (OoO), superscalar execution, while avoiding substantial complexity and overhead in both processor hardware and associated software. In some examples of the disclosed technology, a block-based processor uses an EDGE ISA designed for area- and energy-efficient, high-ILP execution. In some examples, use of EDGE architectures and associated compilers finesses away much of the register renaming, CAMs, and complexity.

In certain examples of the disclosed technology, an EDGE ISA can eliminate the need for one or more complex architectural features, including register renaming, dataflow analysis, misspeculation recovery, and in-order retirement while supporting mainstream programming languages such as C and C++. In certain examples of the disclosed technology, a block-based processor executes a plurality of two or more instructions as an atomic block. Block-based instructions can be used to express semantics of program data flow and/or instruction flow in a more explicit fashion, allowing for improved compiler and processor performance. In certain examples of the disclosed technology, an explicit data graph execution instruction set architecture (EDGE ISA) includes information about program control flow that can be used to improve detection of improper control flow instructions, thereby increasing performance, saving memory resources, and/or and saving energy.

In some examples of the disclosed technology, instructions organized within instruction blocks are fetched, executed, and committed atomically. Instructions inside blocks execute in dataflow order, which reduces or eliminates using register renaming and provides power-efficient OoO execution. A compiler can be used to explicitly encode data dependencies through the ISA, reducing or eliminating burdening processor core control logic from rediscovering dependencies at runtime. Using predicated execution, intra-block branches can be converted to dataflow instructions, and dependencies, other than memory dependencies, can be limited to direct data dependencies. Disclosed target form encoding techniques allow instructions within a block to communicate their operands directly via operand buffers, reducing accesses to a power-hungry, multi-ported physical register files.

Between instruction blocks, instructions can communicate using memory and registers. Thus, by utilizing a hybrid dataflow execution model, EDGE architectures can still support imperative programming languages and sequential memory semantics, but desirably also enjoy the benefits of out-of-order execution with near in-order power efficiency and complexity.

As will be readily understood to one of ordinary skill in the relevant art, a spectrum of implementations of the disclosed technology are possible with various area and performance tradeoffs.

III. Example Block-Based Processor

FIG. 1 is a block diagram 10 of a block-based processor 100 as can be implemented in some examples of the disclosed technology. The processor 100 is configured to execute atomic blocks of instructions according to an instruction set architecture (ISA), which describes a number of aspects of processor operation, including a register model, a number of defined operations performed by block-based instructions, a memory model, interrupts, and other architectural features. The block-based processor includes a plurality of processing cores 110, including a processor core 111.

As shown in FIG. 1, the processor cores are connected to each other via core interconnect 120. The core interconnect 120 carries data and control signals between individual ones of the cores 110, a memory interface 140, and an input/output (I/O) interface 145. The core interconnect 120 can transmit and receive signals using electrical, optical, magnetic, or other suitable communication technology and can provide communication connections arranged according to a number of different topologies, depending on a particular desired configuration. For example, the core interconnect 120 can have a crossbar, a bus, a point-to-point bus, or other suitable topology. In some examples, any one of the cores 110 can be connected to any of the other cores, while in other examples, some cores are only connected to a subset of the other cores. For example, each core may only be connected to a nearest 4, 8, or 20 neighboring cores. The core interconnect 120 can be used to transmit input/output data to and from the cores, as well as transmit control signals and other information signals to and from the cores. For example, each of the cores 110 can receive and transmit semaphores that indicate the execution status of instructions currently being executed by each of the respective cores. In some examples, the core interconnect 120 is implemented as wires connecting the cores 110, and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from the processor 100 are not limited to full swing electrical digital signals, but the processor can be configured to include differential signals, pulsed signals, or other suitable signals for transmitting data and control signals.

In the example of FIG. 1, the memory interface 140 of the processor includes interface logic that is used to connect to additional memory, for example, memory located on another integrated circuit besides the processor 100. As shown in FIG. 1 an external memory system 150 includes an L2 cache 152 and main memory 155. In some examples the L2 cache can be implemented using static RAM (SRAM) and the main memory 155 can be implemented using dynamic RAM (DRAM). In some examples the memory system 150 is included on the same integrated circuit as the other components of the processor 100. In some examples, the memory interface 140 includes a direct memory access (DMA) controller allowing transfer of blocks of data in memory without using register file(s) and/or the processor 100. In some examples, the memory interface manages allocation of virtual memory, expanding the available main memory 155.

The I/O interface 145 includes circuitry for receiving and sending input and output signals to other components, such as hardware interrupts, system control signals, peripheral interfaces, co-processor control and/or data signals (e.g., signals for a graphics processing unit, floating point coprocessor, physics processing unit, digital signal processor, or other co-processing components), clock signals, semaphores, or other suitable I/O signals. The I/O signals may be synchronous or asynchronous. In some examples, all or a portion of the I/O interface is implemented using memory-mapped I/O techniques in conjunction with the memory interface 140.

The block-based processor 100 can also include a control unit 160. The control unit 160 supervises operation of the processor 100. Operations that can be performed by the control unit 160 can include allocation and de-allocation of cores for performing instruction processing, control of input data and output data between any of the cores, register files, the memory interface 140, and/or the I/O interface 145, modification of execution flow, and verifying target location(s) of branch instructions, instruction headers, and other changes in control flow. The control unit 160 can generate and control the processor according to control flow and metadata information representing exit points and control flow probabilities for instruction blocks.

The control unit 160 can also process hardware interrupts, and control reading and writing of special system registers, for example, instruction block address registers. In some examples of the disclosed technology, the control unit 160 is at least partially implemented using one or more of the processing cores 110, while in other examples, the control unit 160 is implemented using a non-block-based processing core (e.g., a general-purpose RISC processing core coupled to memory). In some examples, the control unit 160 is implemented at least in part using one or more of: hardwired finite state machines, programmable microcode, programmable gate arrays, or other suitable control circuits. In alternative examples, control unit functionality can be performed by one or more of the cores 110.

The control unit 160 includes a scheduler 161 that is used to allocate instruction blocks to the processor cores 110. As used herein, scheduler block allocation refers to directing operation of an instruction blocks, including initiating instruction block mapping, fetching, decoding, execution, committing, aborting, idling, and refreshing an instruction block. Further, instruction scheduling refers to scheduling the issuance and execution of instructions within an instruction block. For example based on instruction dependencies and data indicating a relative ordering for memory access instructions, the control unit 160 can determine which instruction(s) in an instruction block are ready to issue and initiate issuance and execution of the instructions. Processor cores 110 are assigned to instruction blocks during instruction block mapping. The recited stages of instruction operation are for illustrative purposes, and in some examples of the disclosed technology, certain operations can be combined, omitted, separated into multiple operations, or additional operations added. The scheduler 161 schedules the flow of instructions including allocation and de-allocation of cores for performing instruction processing, control of input data and output data between any of the cores, register files, the memory interface 140, and/or the I/O interface 145.

The control unit 160 includes a plurality of instruction block address registers 165, labeled IBAR0 through IBAR3. Each of the instruction block address registers can store a memory address that indicates an entry location for executing an instruction block. In some examples, each of the instruction block address registers holds a memory address for a currently executing process or thread. In some examples, one or more of the instruction block address registers store an address for another instruction block that is to be executed subsequently. In some examples, one or more of the instruction block address registers store an entry point address for an instruction block that is to be speculatively executed. The number of instruction block address registers can vary from 0 up to 4, 8, or more registers, depending on the number of processes and/or threads supported by the block-based processor cores 110 of the block-based processor 100, and the number of instruction blocks that can be speculatively executed concurrently.

In some examples, each respective plurality of instruction block address registers 165 indexes an entry location for concurrently executing a respective instruction block with the block-based processor. In some examples, each respective plurality of instruction block address registers 165 indexes an entry location for speculatively executing a respective instruction block with the block-based processor.

The block-based processor 100 also includes a clock generator 170, which distributes one or more clock signals to various components within the processor (e.g., the cores 110, interconnect 120, memory interface 140, and I/O interface 145). In some examples of the disclosed technology, all of the components share a common clock, while in other examples different components use a different clock, for example, a clock signal having differing clock frequencies. In some examples, a portion of the clock is gated to allowing power savings when some of the processor components are not in use. In some examples, the clock signals are generated using a phase-locked loop (PLL) to generate a signal of fixed, constant frequency and duty cycle. Circuitry that receives the clock signals can be triggered on a single edge (e.g., a rising edge) while in other examples, at least some of the receiving circuitry is triggered by rising and falling clock edges. In some examples, the clock signal can be transmitted optically or wirelessly.

IV. Example Block-Based Processor Core

Figure 2:
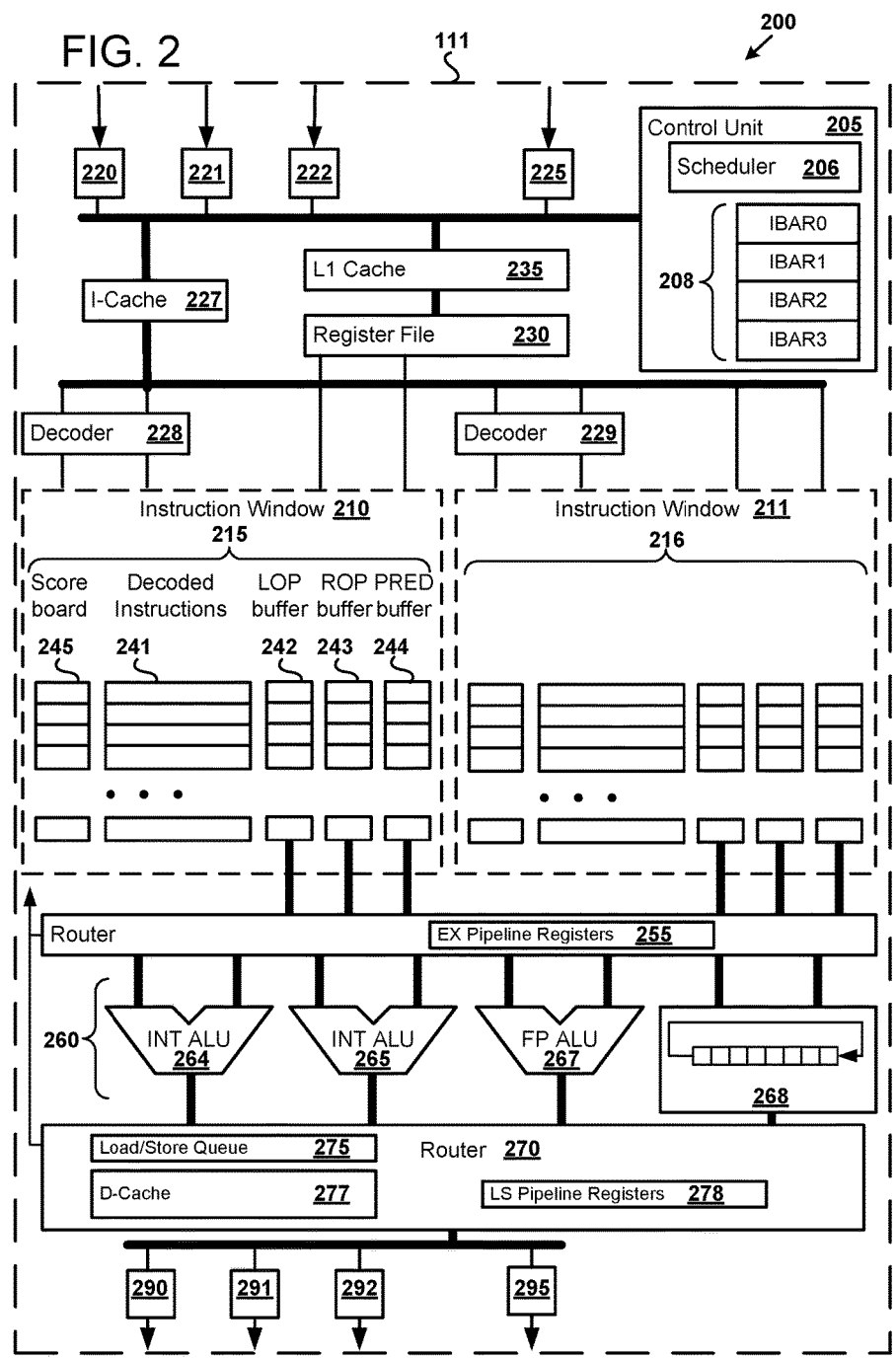
FIG. 2 illustrates a block-based processor core, as can be used in some examples of the disclosed technology.

FIG. 2 is a block diagram 200 further detailing an example microarchitecture for the block-based processor 100, and in particular, an instance of one of the block-based processor cores, as can be used in certain examples of the disclosed technology. For ease of explanation, the exemplary block-based processor core is illustrated with five stages: instruction fetch (IF), decode (DC), operand fetch, execute (EX), and memory/data access (LS). However, it will be readily understood by one of ordinary skill in the relevant art that modifications to the illustrated microarchitecture, such as adding/removing stages, adding/removing units that perform operations, and other implementation details can be modified to suit a particular application for a block-based processor.

As shown in FIG. 2, the processor core 111 includes a control unit 205, which generates control signals to regulate core operation and schedules the flow of instructions within the core using an instruction scheduler 206. Operations that can be performed by the control unit 205 and/or instruction scheduler 206 can include allocation and de-allocation of cores for performing instruction processing, control of input data and output data between any of the cores, register files, the memory interface 140, and/or the I/O interface 145. The control unit 205 can also process hardware interrupts, and control reading and writing of special system registers, for example, instruction block address registers. In other examples of the disclosed technology, the control unit 205 and/or instruction scheduler 206 are implemented using a non-block-based processing core (e.g., a general-purpose RISC processing core coupled to memory). In some examples, the control unit 205 and/or instruction scheduler 206 are implemented at least in part using one or more of: hardwired finite state machines, programmable microcode, programmable gate arrays, or other suitable control circuits.

As shown in FIG. 2, the control unit 205 further includes a plurality of one or more instruction block address registers 208 that can be accessed to determine exit points and entry points for instruction blocks executed by the block-based processor core 111. The applications of the illustrated plurality of instruction block address registers 208 are similar to those IBARs discussed above regarding the control unit 160. Each respective instruction block address register can store an index address to the memory storing a plurality of instructions for an instruction block, the indexed address being inaccessible when the processor is in one or more unprivileged operational modes. Thus, each of the instruction block address registers storing an index address to the memory for a respective instruction block to be speculatively fetched, decoded, and/or executed by the processor. One or more execution units, discussed below, are configured to execute instructions for the instruction block, and the control unit 205 configured to fetch and decode two or more of the plurality of instructions from the memory based on the indexed address, and without changing the index address stored in the instruction block address register. The instruction blocks encoding the plurality of instructions can be of variable length. Further, the control unit 205 is further configured to execute a branch instruction encoded in an instruction block by changing the index address stored in the instruction block address register to a result value generated by the branch instruction.

The exemplary processor core 111 includes two instructions windows 210 and 211, each of which can be configured to execute an instruction block. In some examples of the disclosed technology, an instruction block is an atomic collection of block-based-processor instructions that includes an instruction block header and a plurality of one or more instructions. As will be discussed further below, the instruction block header includes information that can be used to further define semantics of one or more of the plurality of instructions within the instruction block. Depending on the particular ISA and processor hardware used, the instruction block header can also be used during execution of the instructions, and to improve performance of executing an instruction block by, for example, allowing for early fetching of instructions and/or data, improved branch prediction, speculative execution, improved energy efficiency, and improved code compactness. In other examples, different numbers of instructions windows are possible, such as one, four, eight, or other number of instruction windows.

Each of the instruction windows 210 and 211 can receive instructions and data from one or more of input ports 220, 221, and 222 which connect to an interconnect bus and instruction cache 227, which in turn is connected to the instruction decoders 228 and 229. Additional control signals can also be received on an additional input port 225. Each of the instruction decoders 228 and 229 decodes instruction headers and/or instructions for an instruction block and stores the decoded instructions within a memory store 215 and 216 located in each respective instruction window 210 and 211.

The processor core 111 further includes a register file 230 coupled to an L1 (level one) cache 235. The register file 230 stores data for registers defined in the block-based processor architecture, and can have one or more read ports and one or more write ports. For example, a register file may include two or more write ports for storing data in the register file, as well as having a plurality of read ports for reading data from individual registers within the register file. In some examples, a single instruction window (e.g., instruction window 210) can access only one port of the register file at a time, while in other examples, the instruction window 210 can access one read port and one write port, or can access two or more read ports and/or write ports simultaneously. In some examples, the register file 230 can include 64 registers, each of the registers holding a word of 32 bits of data. (For convenient explanation, this application will refer to 32-bits of data as a word, unless otherwise specified. Suitable processors according to the disclosed technology could operate with 8-, 16-, 64-, 128-, 256-bit, or another number of bits words) In some examples, some of the registers within the register file 230 may be allocated to special purposes. For example, some of the registers can be dedicated as system registers examples of which include registers storing constant values (e.g., an all zero word), a physical core number, a logical core number, a core assignment topology, core control flags, execution flags, a processor topology, or other suitable dedicated purpose. In some examples, use of the system registers may be restricted by the operating system or other supervisory computer instructions. In some examples, the register file 230 is implemented as an array of flip-flops, while in other examples, the register file can be implemented using latches, SRAM, or other forms of memory storage. The ISA specification for a given processor, for example processor 100, specifies how registers within the register file 230 are defined and used.

In some examples, the processor 100 includes a global register file that is shared by a plurality of the processor cores. In some examples, individual register files associate with a processor core can be combined to form a larger file, statically or dynamically, depending on the processor ISA and configuration.

As shown in FIG. 2, the memory store 215 of the instruction window 210 includes a number of decoded instructions 241, a left operand (LOP) buffer 242, a right operand (ROP) buffer 243, a predicate (PRED) buffer, and an instruction scoreboard 245. In some examples of the disclosed technology, each instruction of the instruction block is decomposed into a row of decoded instructions, left and right operands, and scoreboard data, as shown in FIG. 2. The decoded instructions 241 can include partially- or fully-decoded versions of instructions stored as bit-level control signals. The operand buffers 242, 243, and 244 store operands (e.g., register values received from the register file 230, data received from memory, immediate operands coded within an instruction, operands calculated by an earlier-issued instruction, or other operand values) until their respective decoded instructions are ready to execute. Instruction operands and predicates are read from the operand buffers 242 and 243 and predicate buffer 244, respectively, not the register file. The instruction scoreboard 245 can include a buffer for predicates directed to an instruction, including wire-OR logic for combining predicates sent to an instruction by multiple instructions.

The memory store 216 of the second instruction window 211 stores similar instruction information (decoded instructions, operands, and scoreboard) as the memory store 215, but is not shown in FIG. 2 for the sake of simplicity. Instruction blocks can be executed by the second instruction window 211 concurrently or sequentially with respect to the first instruction window, subject to ISA constraints and as directed by the control unit 205.

In some examples of the disclosed technology, front-end pipeline stages IF and DC can run decoupled from the back-end pipelines stages (IS, EX, LS). The control unit can fetch and decode two instructions per clock cycle into each of the instruction windows 210 and 211. The control unit 205 provides instruction window dataflow scheduling logic to monitor the ready state of each decoded instruction's inputs (e.g., each respective instruction's predicate(s) and operand(s) using the scoreboard 245. The control unit 205 further monitors data indicating a relative ordering of memory access instructions (e.g., using load/store identifiers generated by the instruction decoder) and data indicating which instructions have executed (e.g., by tracking each instruction and/or maintaining a count of a number of memory store instructions that have issued). When all of the input operands and predicate(s) for a particular decoded instruction are ready, and any previously-ordered memory access instructions (e.g., previously ordered memory store instructions) have issued and/or executed, the instruction is ready to issue. The control unit 205 then initiates execution of (issues) one or more next instruction(s) (e.g., the lowest numbered ready instruction) each cycle, and control signals based on the decoded instruction and the instruction's input operands are sent to one or more of functional units 260 for execution. The decoded instruction can also encodes a number of ready events. The scheduler in the control unit 205 accepts these and/or events from other sources and updates the ready state of other instructions in the window. Thus execution proceeds, starting with the processor core's 111 ready zero input instructions, instructions that are targeted by the zero input instructions, and so forth.

The decoded instructions 241 need not execute in the same order in which they are arranged within the memory store 215 of the instruction window 210. Rather, the instruction scoreboard 245 is used to track dependencies of the decoded instructions and, when the dependencies have been met, the associated individual decoded instruction is scheduled for execution. For example, a reference to a respective instruction can be pushed onto a ready queue when the dependencies have been met for the respective instruction, and ready instructions can be scheduled in a first-in first-out (FIFO) order from the ready queue. For instructions associated with generated load store identifiers (LSIDs), the execution order will also follow the priorities enumerated in the generated instruction LSIDs, or by executed in an order that appears as if the instructions were executed in the specified order.

Information stored in the scoreboard 245 can include, but is not limited to, the associated instruction's execution predicate(s) (such as whether the instruction is waiting for a predicate bit to be calculated and whether the instruction executes if the predicate bit is true or false), availability of operands to the instruction, or other prerequisites required before issuing and executing the associated individual instruction. The number of instructions that are stored in each instruction window generally corresponds to the number of instructions within an instruction block. In some examples, operands and/or predicates are received on one or more broadcast channels that allow sending the same operand or predicate to a larger number of instructions. In some examples, the number of instructions within an instruction block can be 32, 64, 128, 1,024, or another number of instructions. In some examples of the disclosed technology, an instruction block is allocated across multiple instruction windows within a processor core. Out-of-order operation and memory access can be controlled according to data specifying one or more modes of operation.

Instructions can be allocated and scheduled using the control unit 205 located within the processor core 111. The control unit 205 orchestrates fetching of instructions from memory, decoding of the instructions, execution of instructions once they have been loaded into a respective instruction window, data flow into/out of the processor core 111, and control signals input and output by the processor core. For example, the control unit 205 can include the ready queue, as described above, for use in scheduling instructions. The instructions stored in the memory store 215 and 216 located in each respective instruction window 210 and 211 can be executed atomically. Thus, updates to the visible architectural state (such as the register file 230 and the memory) affected by the executed instructions can be buffered locally within the core 111 until the instructions are committed. The control unit 205 can determine when instructions are ready to be committed, sequence the commit logic, and issue a commit signal. For example, a commit phase for an instruction block can begin when all register writes are buffered, all writes to memory are buffered, and a branch target is calculated. The instruction block can be committed when updates to the visible architectural state are complete. For example, an instruction block can be committed when the register writes are written to as the register file, the stores are sent to a load/store unit or memory controller, and the commit signal is generated. The control unit 205 also controls, at least in part, allocation of functional units 260 to each of the respective instructions windows.

Because the instruction block is committed (or aborted) as an atomic transactional unit, it should be noted that results of certain operations are not available to instructions within an instruction block. For example, register write and memory store operations are completed during block commit, and so are available to subsequent instruction blocks, but not the present instruction block.

As shown in FIG. 2, a first router 250, which has a number of execution pipeline registers 255, is used to send data from either of the instruction windows 210 and 211 to one or more of the functional units 260, which can include but are not limited to, integer ALUs (arithmetic logic units) (e.g., integer ALUs 264 and 265), floating point units (e.g., floating point ALU 267), shift/rotate logic (e.g., barrel shifter 268), or other suitable execution units, which can including graphics functions, physics functions, and other mathematical operations. Data from the functional units 260 can then be routed through a second router 270 to outputs 290, 291, and 292, routed back to an operand buffer (e.g. LOP buffer 242 and/or ROP buffer 243), or fed back to another functional unit, depending on the requirements of the particular instruction being executed. The second router 270 include a load/store queue 275, which can be used to issue memory instructions, a data cache 277, which stores data being input to or output from the core to memory, and load/store pipeline register 278.

The core also includes control outputs 295 which are used to indicate, for example, when execution of all of the instructions for one or more of the instruction windows 210 or 211 has completed. When execution of an instruction block is complete, the instruction block is designated as "committed" and signals from the control outputs 295 can in turn can be used by other cores within the block-based processor 100 and/or by the control unit 160 to initiate scheduling, fetching, and execution of other instruction blocks. Both the first router 250 and the second router 270 can send data back to the instruction (for example, as operands for other instructions within an instruction block). In some examples, data indicating relative ordering and execution status is used to determine whether the instruction block can be committed.

As will be readily understood to one of ordinary skill in the relevant art, the components within an individual core are not limited to those shown in FIG. 2, but can be varied according to the requirements of a particular application. For example, a core may have fewer or more instruction windows, a single instruction decoder might be shared by two or more instruction windows, and the number of and type of functional units used can be varied, depending on the particular targeted application for the block-based processor. Other considerations that apply in selecting and allocating resources with an instruction core include performance requirements, energy usage requirements, integrated circuit die, process technology, and/or cost.

It will be readily apparent to one of ordinary skill in the relevant art that trade-offs can be made in processor performance by the design and allocation of resources within the instruction window (e.g., instruction window 210) and control unit 205 of the processor cores 110. The area, clock period, capabilities, and limitations substantially determine the realized performance of the individual cores 110 and the throughput of the block-based processor 100.

The instruction scheduler 206 can have diverse functionality. In certain higher performance examples, the instruction scheduler is highly concurrent. For example, each cycle, the decoder(s) write instructions' decoded ready state and decoded instructions into one or more instruction windows, selects the next instruction to issue, and, in response the back end sends ready events—either target-ready events targeting a specific instruction's input slot (predicate, left operand, right operand, etc.), or broadcast-ready events targeting all instructions. The per-instruction ready state bits, together with the decoded ready state can be used to determine that the instruction is ready to issue.

In some cases, the scheduler 206 accepts events for target instructions that have not yet been decoded and must also inhibit reissue of issued ready instructions. In some examples, instructions can be non-predicated, or predicated (based on a true or false condition). A predicated instruction does not become ready until it is targeted by another instruction's predicate result, and that result matches the predicate condition. If the associated predicate does not match, the instruction never issues. In some examples, predicated instructions may be issued and executed speculatively. In some examples, a processor may subsequently check that speculatively issued and executed instructions were correctly speculated. In some examples a misspeculated issued instruction and the specific transitive closure of instructions in the block that consume its outputs may be re-executed, or misspeculated side effects annulled. In some examples, discovery of a misspeculated instruction leads to the complete roll back and re-execution of an entire block of instructions.

Upon branching to a new instruction block, the respective instruction window(s) ready state is cleared (a block reset). However when an instruction block branches back to itself (a block refresh), only active ready state is cleared. The decoded ready state for the instruction block can thus be preserved so that it is not necessary to re-fetch and decode the block's instructions. Hence, block refresh can be used to save time and energy in loops.

V. Example Stream of Instruction Blocks

Figure 3:
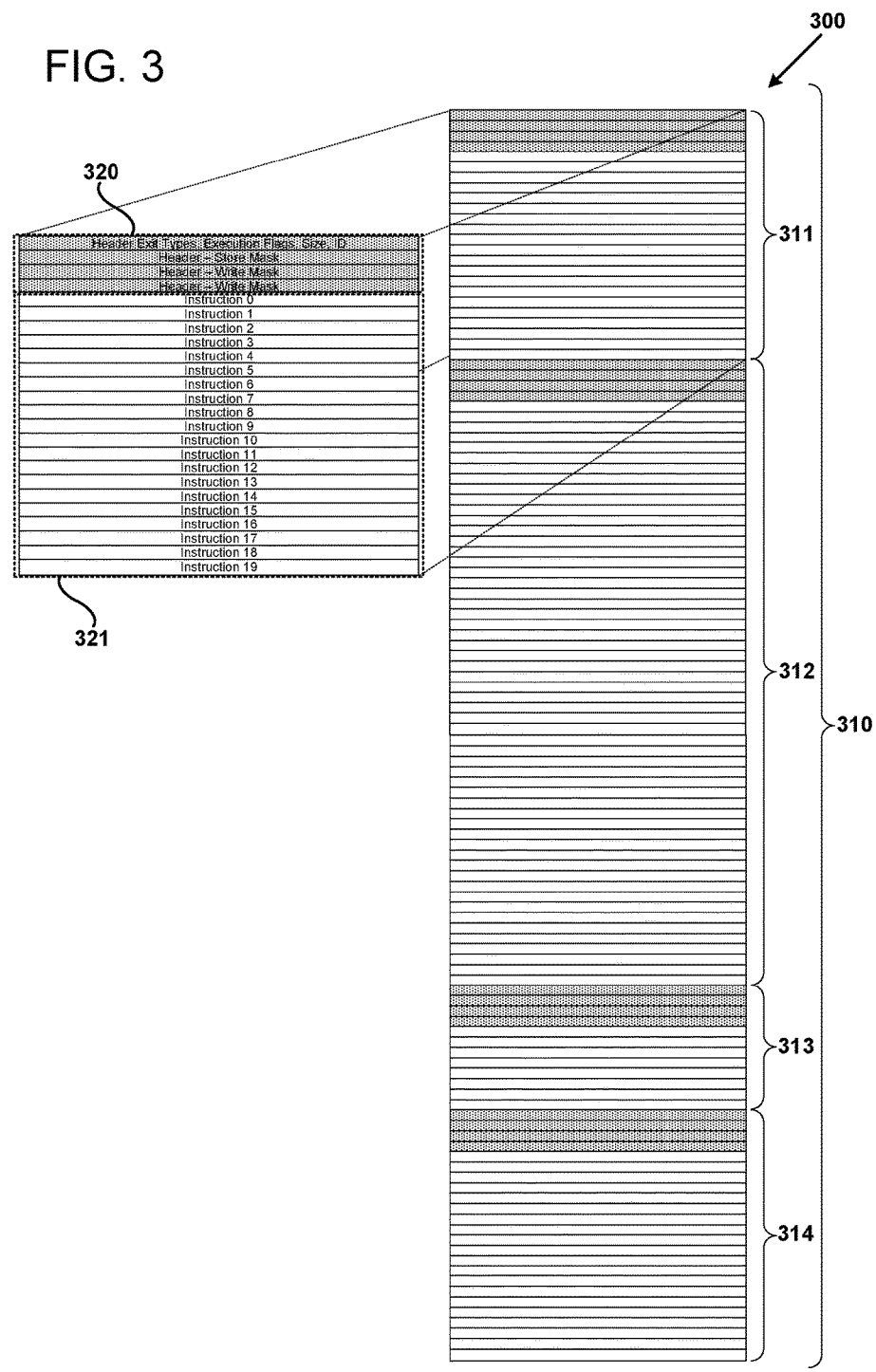
FIG. 3 illustrates a number of instruction blocks, according to certain examples of disclosed technology.

Turning now to the diagram 300 of FIG. 3, a portion 310 of a stream of block-based instructions, including a number of variable length instruction blocks 311-314 is illustrated. The stream of instructions can be used to implement user application, system services, or any other suitable use. The stream of instructions can be stored in memory, received from another process in memory, received over a network connection, or stored or received in any other suitable manner. In the example shown in FIG. 3, each instruction block begins with an instruction header, which is followed by a varying number of instructions. For example, the instruction block 311 includes a header 320 and twenty instructions 321. The memory address of the first word of the instruction header 320 serves as an entry location for fetching the instruction block. The memory address can be stored in an instruction block address register, which can be read by a control unit to determine where in memory to read an instruction block. Thus, the instruction block address register does not directly store an address of any of the instructions (321) to be executed by the at least one processor core.

The particular instruction header 320 illustrated includes a number of data fields that control, in part, execution of the instructions within the instruction block, and also allow for improved performance enhancement techniques including, for example branch prediction, speculative execution, lazy evaluation, and/or other techniques. The instruction header 320 also includes an ID bit which indicates that the header is an instruction header and not an instruction. In some examples, the instruction blocks can be of variable size, and the instruction header 320 includes an indication of the instruction block size. The instruction block size can be in larger chunks of instructions than one, for example, the number of 4-instruction chunks contained within the instruction block. In other words, the size of the block is shifted 4 bits in order to compress header space allocated to specifying instruction block size. Thus, a size value of 0 indicates a minimally-sized instruction block which is a block header followed by four instructions. In some examples, the instruction block size is expressed as a number of bytes, as a number of words, as a number of n-word chunks, as an address, as an address offset, or using other suitable expressions for describing the size of instruction blocks. In some examples, the instruction block size is indicated by a terminating bit pattern in the instruction block header and/or footer. A control unit controlling fetch and decode of an instruction block can use the size field to determine how many instructions to read for the current instruction block.

The instruction block header 320 can also include one or more execution flags that indicate one or more modes of operation for executing the instruction block. For example, the modes of operation can include core fusion operation, vector mode operation, branch prediction or memory dependence prediction, and/or in-order or deterministic instruction execution. Further, the execution flags can include a block synchronization flag that inhibits speculative execution of the instruction block.

In some examples of the disclosed technology, the instruction header 320 includes one or more identification bits that indicate that the encoded data is an instruction header. For example, in some block-based processor ISAs, a single ID bit in the least significant bit space is always set to the binary value 1 to indicate the beginning of a valid instruction block. In other examples, different bit encodings can be used for the identification bit(s). In some examples, the instruction header 320 includes information indicating a particular version of the ISA for which the associated instruction block is encoded.

The block instruction header can also include a number of block exit types for use in, for example, branch prediction, control flow determination, and/or branch processing. The exit type can indicate what the type of branch instructions are, for example: sequential branch instructions, which point to the next contiguous instruction block in memory; offset instructions, which are branches to another instruction block at a memory address calculated relative to an offset; subroutine calls, or subroutine returns. By encoding the branch exit types in the instruction header, the branch predictor can begin operation, at least partially, before branch instructions within the same instruction block have been fetched and/or decoded. Branch prediction, speculative execution, branch processing, and other operations can use one or more instruction block address registers to store a calculated entry location for an instruction block that is used by fetch and decode logic to determine a plurality of memory locations storing data for the instruction block.

The illustrated instruction block header 320 also includes a store mask that indicates which of the load-store queue identifiers encoded in the block instructions are assigned to store operations. The instruction block header can also include a write mask, which identifies which global register(s) the associated instruction block will write. The associated register file must receive a write to each entry before the instruction block can complete. In some examples a block-based processor architecture can include not only scalar instructions, but also single-instruction multiple-data (SIMD) instructions, that allow for operations with a larger number of data operands within a single instruction.

Examples of suitable block-based instructions that can be used for the instructions 321 can include instructions for executing integer and floating-point arithmetic, logical operations, type conversions, register reads and writes, memory loads and stores, execution of branches and jumps, and other suitable processor instructions.

VI. Example Block Instruction Target Encoding

Figure 4:
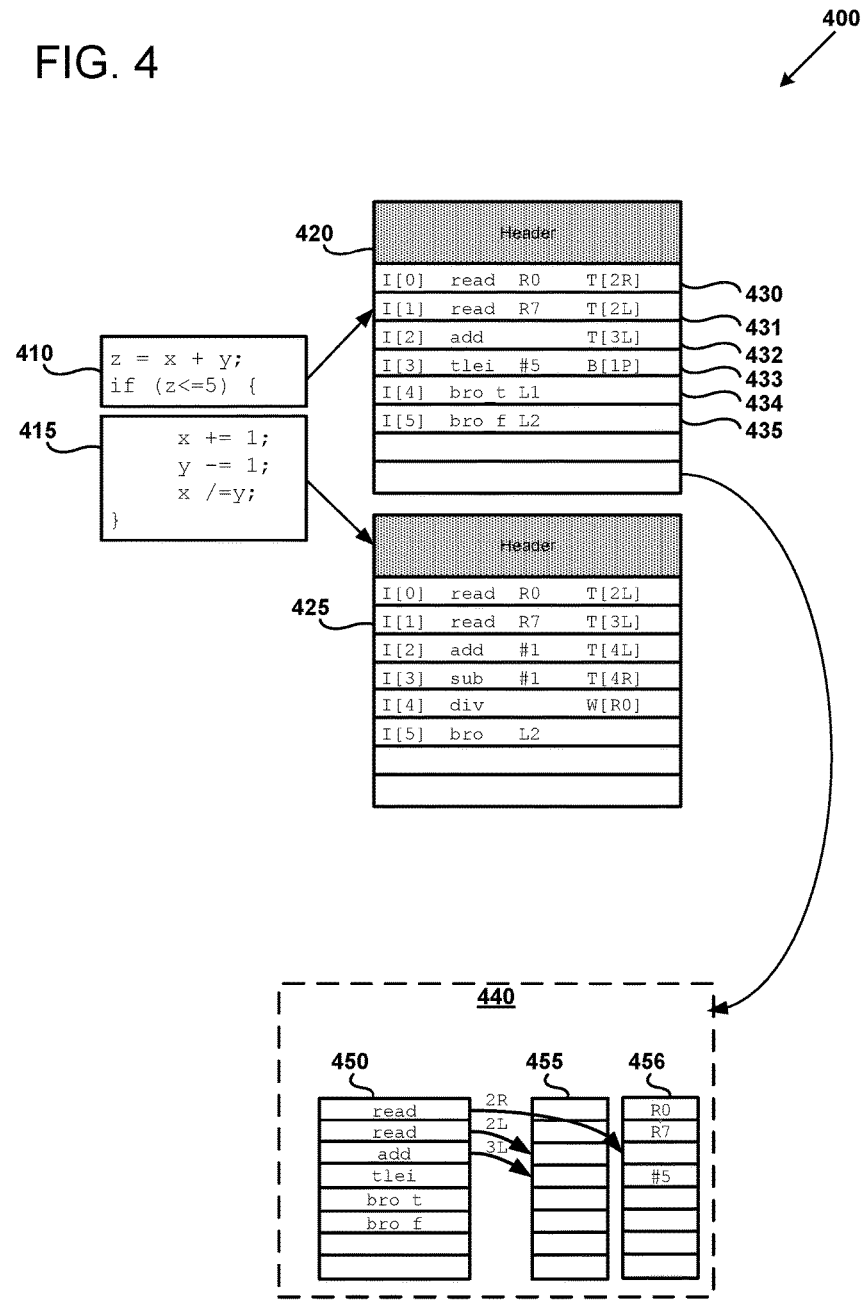
FIG. 4 illustrates portions of source code and instruction blocks, as can be used in some examples of the disclosed technology.

FIG. 4 is a diagram 400 depicting an example of two portions 410 and 415 of C language source code and their respective instruction blocks 420 and 425, illustrating how block-based instructions can explicitly encode their targets. In this example, the first two READ instructions 430 and 431 target the right (T[2R]) and left (T[2L]) operands, respectively, of the ADD instruction 432 (2R indicates targeting the right operand of instruction number 2; 2L indicates the left operand of instruction number 2). The right operand may also be referred to as OP0 and the left operand, OP1. Further, in some examples of the disclosed technology, an instruction has one input operand, or more than two input operands. In the illustrated ISA, the read instruction is the only instruction that reads from the global register file (e.g., register file 230); however any instruction can target, the global register file. When the ADD instruction 432 receives the result of both register reads it will become ready and execute.

When the TLEI (test-less-than-equal-immediate) instruction 433 receives its single input operand from the ADD, it will become ready to issue and execute. The test then produces a predicate operand that is broadcast on channel one (B[1P]) to all instructions listening on the broadcast channel for the predicate, which in this example are the two predicated branch instructions (BRO_T 434 and BRO_F 435). The branch instruction that receives a matching predicate will fire (execute), but the other instruction, encoded with the complementary predicated, will not fire/execute.

A dependence graph 440 for the instruction block 420 is also illustrated, as an array 450 of instruction nodes and their corresponding operand targets 455 and 456. This illustrates the correspondence between the instruction blocks 420, the corresponding instruction window entries, and the underlying dataflow graph represented by the instructions. Here decoded instructions READ 430 and READ 431 are ready to issue, as they have no input dependencies. As they issue and execute, the values read from registers R0 and R7 are written into the right and left operand buffers of ADD 432, marking the left and right operands of ADD 432 "ready." As a result, the ADD 432 instruction becomes ready, issues to an ALU, executes, and the sum is written to the left operand of the TLEI instruction 433.

VII. Example Block-Based Instruction Formats

Figure 5:
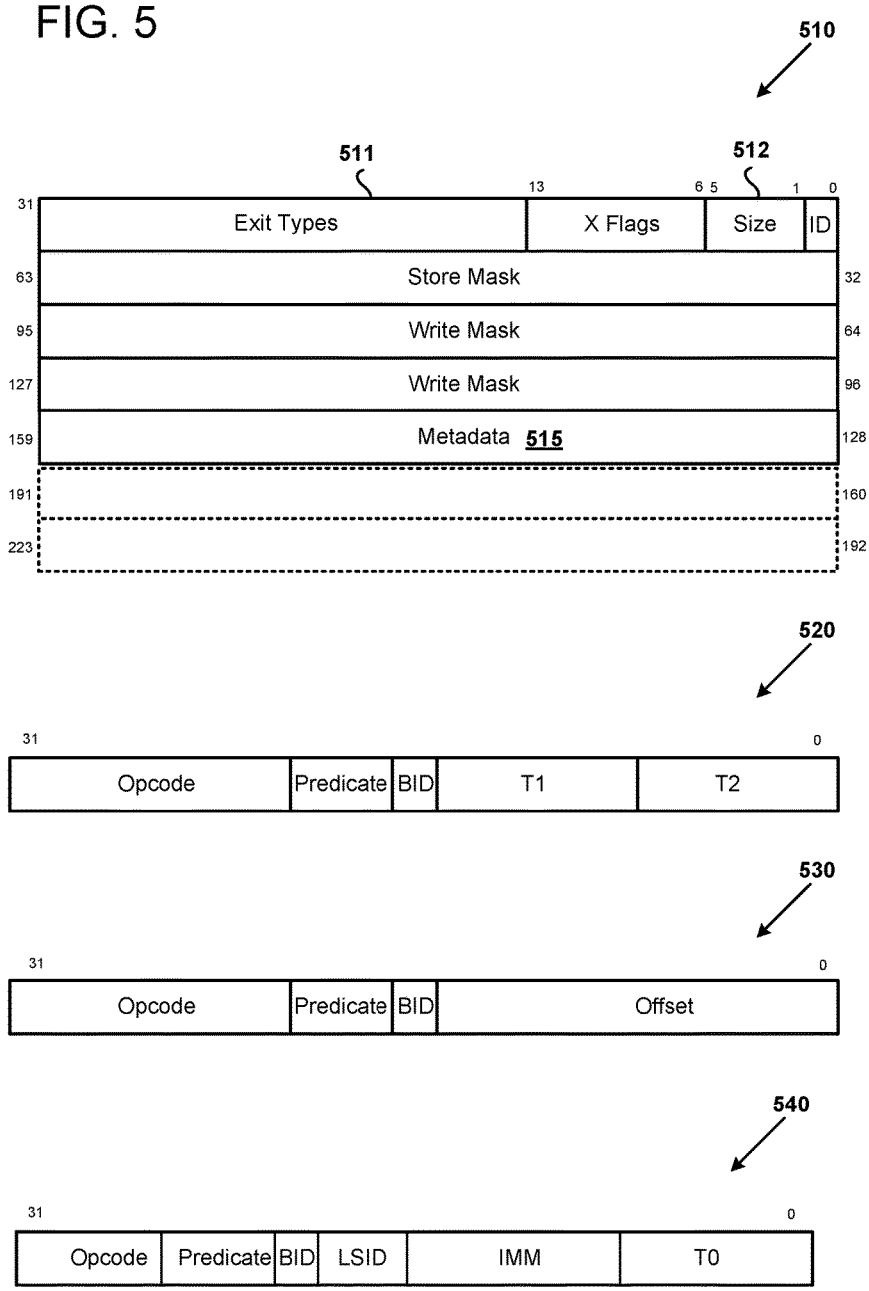
FIG. 5 illustrates block-based processor headers and instructions, as can be used in some examples of the disclosed technology.

FIG. 5 is a diagram illustrating generalized examples of instruction formats for an instruction header 510, a generic instruction 520, a branch instruction 530, and a memory access instruction 540 (e.g., a memory load or store instruction). The instruction formats can be used for instruction blocks executed according to a number of execution flags specified in an instruction header that specify a mode of operation. Each of the instruction headers or instructions is labeled according to the number of bits. For example the instruction header 510 includes four 32-bit words and is labeled from its least significant bit (lsb) (bit 0) up to its most significant bit (msb) (bit 127). As shown, the instruction header includes a write mask field, a number of exit type fields 511, a number of execution flag fields, an instruction block size field 512, and an instruction header ID bit (the least significant bit of the instruction header). In some examples, the instruction header 510 includes additional metadata 515, which can be used to control additional aspects of instruction block execution and performance.

The execution flag fields depicted in FIG. 5 occupy bits 6 through 13 of the instruction block header 510 and indicate one or more modes of operation for executing the instruction block. For example, the modes of operation can include core fusion operation, vector mode operation, branch predictor inhibition, memory dependence predictor inhibition, block synchronization, break after block, break before block, block fall through, and/or in-order or deterministic instruction execution. The block synchronization flag occupies bit 9 of the instruction block and inhibits speculative execution of the instruction block when set to logic 1.

The exit type fields include data that can be used to indicate the types of control flow instructions encoded within the instruction block. For example, the exit type fields can indicate that the instruction block includes one or more of the following: sequential branch instructions, offset branch instructions, indirect branch instructions, call instructions, and/or return instructions. In some examples, the branch instructions can be any control flow instructions for transferring control flow between instruction blocks, including relative and/or absolute addresses, and using a conditional or unconditional predicate. The exit type fields can be used for branch prediction and speculative execution in addition to determining implicit control flow instructions. Addresses can be calculated for next instruction blocks to be speculatively executed and stored in an instruction block address register. In some examples, up to six exit types can be encoded in the exit type fields, and the correspondence between fields and corresponding explicit or implicit control flow instructions can be determined by, for example, examining control flow instructions in the instruction block.

The illustrated generic block instruction 520 is stored as one 32-bit word and includes an opcode field, a predicate field, a broadcast ID field (BID), a first target field (T1), and a second target field (T2). For instructions with more consumers than target fields, a compiler can build a fanout tree using move instructions, or it can assign high-fanout instructions to broadcasts. Broadcasts support sending an operand over a lightweight network to any number of consumer instructions in a core.

While the generic instruction format outlined by the generic instruction 520 can represent some or all instructions processed by a block-based processor, it will be readily understood by one of skill in the art that, even for a particular example of an ISA, one or more of the instruction fields may deviate from the generic format for particular instructions. The opcode field specifies the operation(s) performed by the instruction 520, such as memory read/write, register load/store, add, subtract, multiply, divide, shift, rotate, system operations, or other suitable instructions. The predicate field specifies the condition under which the instruction will execute. For example, the predicate field can specify the value "true," and the instruction will only execute if a corresponding condition flag matches the specified predicate value. In some examples, the predicate field specifies, at least in part, which is used to compare the predicate, while in other examples, the execution is predicated on a flag set by a previous instruction (e.g., the preceding instruction in the instruction block). In some examples, the predicate field can specify that the instruction will always, or never, be executed. Thus, use of the predicate field can allow for denser object code, improved energy efficiency, and improved processor performance, by reducing the number of branch instructions.

The target fields T1 and T2 specify the instructions to which the results of the block-based instruction are sent. For example, an ADD instruction at instruction slot 5 can specify that its computed result will be sent to instructions at slots 3 and 10, including specification of the operand slot (e.g., left operation, right operand, or predicate operand). Depending on the particular instruction and ISA, one or both of the illustrated target fields can be replaced by other information, for example, the first target field T1 can be replaced by an immediate operand, an additional opcode, specify two targets, etc.

The branch instruction 530 includes an opcode field, a predicate field, a broadcast ID field (BID), and an offset field. The opcode and predicate fields are similar in format and function as described regarding the generic instruction. The offset can be expressed in units of groups of four instructions, thus extending the memory address range over which a branch can be executed. The predicate shown with the generic instruction 520 and the branch instruction 530 can be used to avoid additional branching within an instruction block. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. For example, a BRO_F (predicated false) instruction will issue if it is sent a false predicate value.

It should be readily understood that, as used herein, the term "branch instruction" is not limited to changing program execution to a relative memory location, but also includes jumps to an absolute or symbolic memory location, subroutine calls and returns, and other instructions that can modify the execution flow. The execution flow is modified by changing the value of an instruction block address register (e.g., using a branch instruction to implicitly change the value), while in other examples, the execution flow can be changed by modifying a value stored at a designated location in virtual memory (e.g., by a memory controller configured to detect reads and write to designated memory location and store/load the values to an instruction block address register). In some examples, a jump register branch instruction is used to jump to a memory location stored in a register. In some examples, subroutine calls and returns are implemented using jump and link and jump register instructions, respectively.

The memory access instruction 540 format includes an opcode field, a predicate field, a broadcast ID field (BID), an immediate field (IMM) offset field, and a target field. The opcode, broadcast, predicate fields are similar in format and function as described regarding the generic instruction. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. The immediate field (e.g., and shifted a number of bits) can be used as an offset for the operand sent to the load or store instruction. The operand plus (shifted) immediate offset is used as a memory address for the load/store instruction (e.g., an address to read data from, or store data to, in memory).

VIII. Example Processor State Diagram

Figure 6:
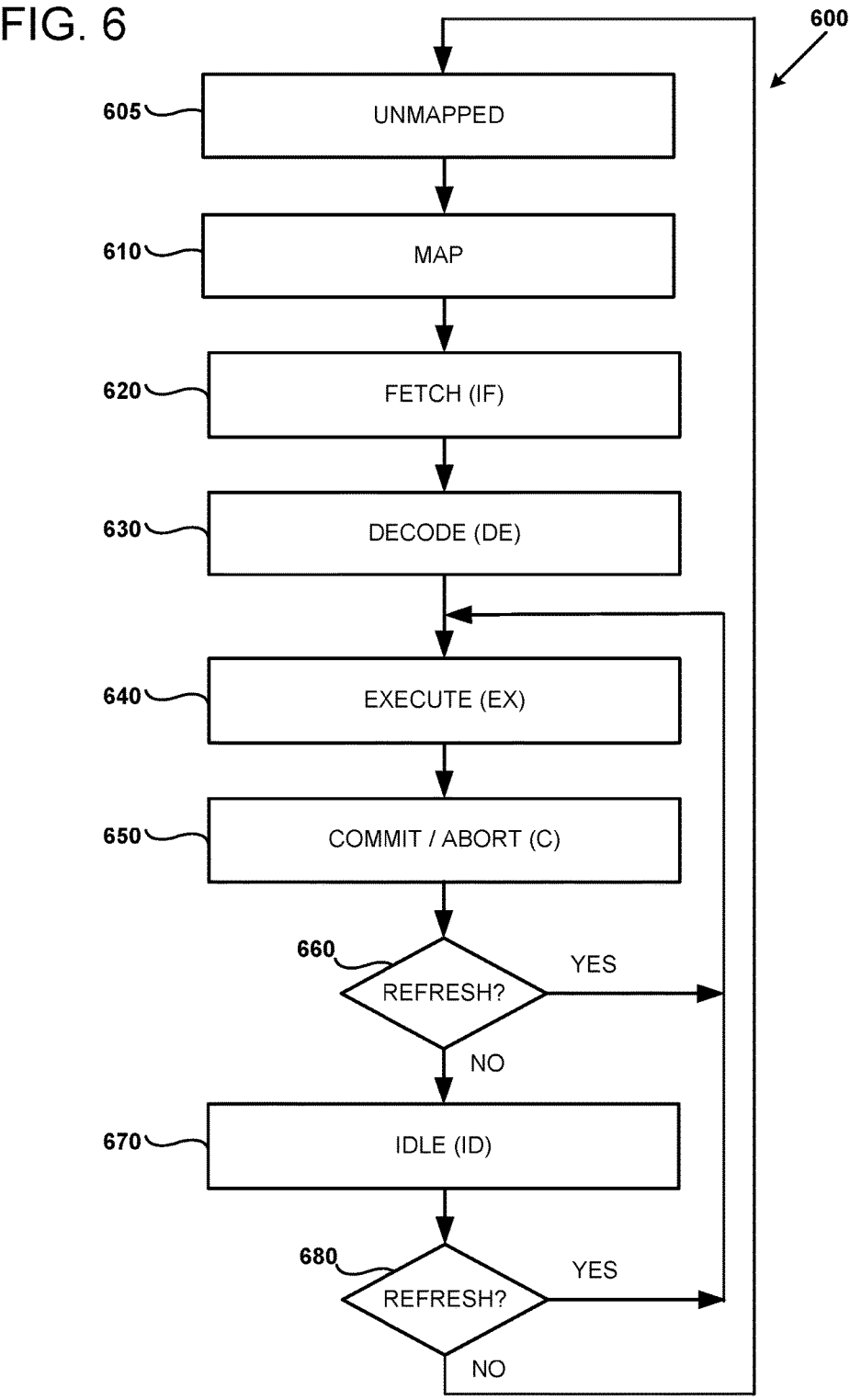
FIG. 6 is a state diagram illustrating a number of states assigned to an instruction block as it is mapped, executed, and retired.

FIG. 6 is a state diagram 600 illustrating number of states assigned to an instruction block as it is mapped, executed, and retired. For example, one or more of the states can be assigned during execution of an instruction according to one or more execution flags. It should be readily understood that the states shown in FIG. 6 are for one example of the disclosed technology, but that in other examples an instruction block may have additional or fewer states, as well as having different states than those depicted in the state diagram 600. At state 605, an instruction block is unmapped. The instruction block may be resident in memory coupled to a block-based processor, stored on a computer-readable storage device such as a hard drive or a flash drive, and can be local to the processor or located at a remote server and accessible using a computer network. The unmapped instructions may also be at least partially resident in a cache memory coupled to the block-based processor.

At instruction block map state 610, control logic for the block-based processor, such as an instruction scheduler, can be used to monitor processing core resources of the block-based processor and map the instruction block to one or more of the processing cores.

The control unit can map one or more of the instruction block to processor cores and/or instruction windows of particular processor cores. In some examples, the control unit monitors processor cores that have previously executed a particular instruction block and can re-use decoded instructions for the instruction block still resident on the "warmed up" processor core. Once the one or more instruction blocks have been mapped to processor cores, the instruction block can proceed to the fetch state 620.

When the instruction block is in the fetch state 620 (e.g., instruction fetch), the mapped processor core fetches computer-readable block instructions from the block-based processors' memory system and loads them into a memory associated with a particular processor core. The entry location for fetching the instructions is read from an instruction block address register. An incremental offset is added to the index address to generate addresses for additional words of header and instruction for the instruction block. A size field encoded in the header is used to indicate the total size of the instruction block. In some examples, other techniques are used, for example, storing a special pattern to indicate the end of an instruction block. Fetched instructions for the instruction block can be fetched and stored in an instruction cache within the processor core. The instructions can be communicated to the processor core using core interconnect. Once at least one instruction of the instruction block has been fetched, the instruction block can enter the instruction decode state 630.

During the instruction decode state 630, various bits of the fetched instruction are decoded into signals that can be used by the processor core to control execution of the particular instruction, including generation of identifiers indicating relative ordering of memory access instructions. For example, the decoded instructions can be stored in one of the memory stores 215 or 216 shown above, in FIG. 2. The decoding includes generating dependencies for the decoded instruction, operand information for the decoded instruction, and targets for the decoded instruction. Once at least one instruction of the instruction block has been decoded, the instruction block can proceed to execution state 640.

During the execution state 640, operations associated with the instruction are performed using, for example, functional units 260 as discussed above regarding FIG. 2. As discussed above, the functions performed can include arithmetical functions, logical functions, branch instructions, memory operations, and register operations. These functions also include generation of an instruction block addresses for the next instruction block. The next instruction block address can be stored in the load/store queue for writing to an instruction block address register. Control logic associated with the processor core monitors execution of the instruction block, and once it is determined that the instruction block can either be committed, or the instruction block is to be aborted, the instruction block state is set to commit/abort 650. In some examples, the control logic uses a write mask and/or a store mask for an instruction block to determine whether execution has proceeded sufficiently to commit the instruction block.

At the commit/abort state 650, the processor core control unit determines that operations performed by the instruction block can be completed. For example memory load store operations, register read/writes, branch instructions (including associated writes to instruction block address registers), and other instructions will definitely be performed according to the control flow of the instruction block. Alternatively, if the instruction block is to be aborted, for example, because one or more of the dependencies of instructions are not satisfied, or the instruction was speculatively executed on a predicate for the instruction block that was not satisfied, the instruction block is aborted so that it will not affect the state of the sequence of instructions in memory or the register file. Regardless of whether the instruction block has committed or aborted, the instruction block goes to state 660 to determine whether the instruction block should be refreshed. If the instruction block is refreshed, the processor core re-executes the instruction block, typically using new data values, particularly the registers and memory updated by the just-committed execution of the block, and proceeds directly to the execute state 640. Thus, the time and energy spent in mapping, fetching, and decoding the instruction block can be avoided. Alternatively, if the instruction block is not to be refreshed, then the instruction block enters an idle state 670.

In the idle state 670, the processor core executing the instruction block can be idled by, for example, powering down hardware within the processor core, while maintaining at least a portion of the decoded instructions for the instruction block. At some point, the control unit determines 680 whether the idle instruction block on the processor core is to be refreshed or not. If the idle instruction block is to be refreshed, the instruction block can resume execution at execute state 640. Alternatively, if the instruction block is not to be refreshed, then the instruction block is unmapped and the processor core can be flushed and subsequently instruction blocks can be mapped to the flushed processor core.

While the state diagram 600 illustrates the states of an instruction block as executing on a single processor core for ease of explanation, it should be readily understood to one of ordinary skill in the relevant art that in certain examples, multiple processor cores can be used to execute multiple instances of a given instruction block, concurrently.

IX. Example Block-Based Processor and Memory Configuration

Figure 7:
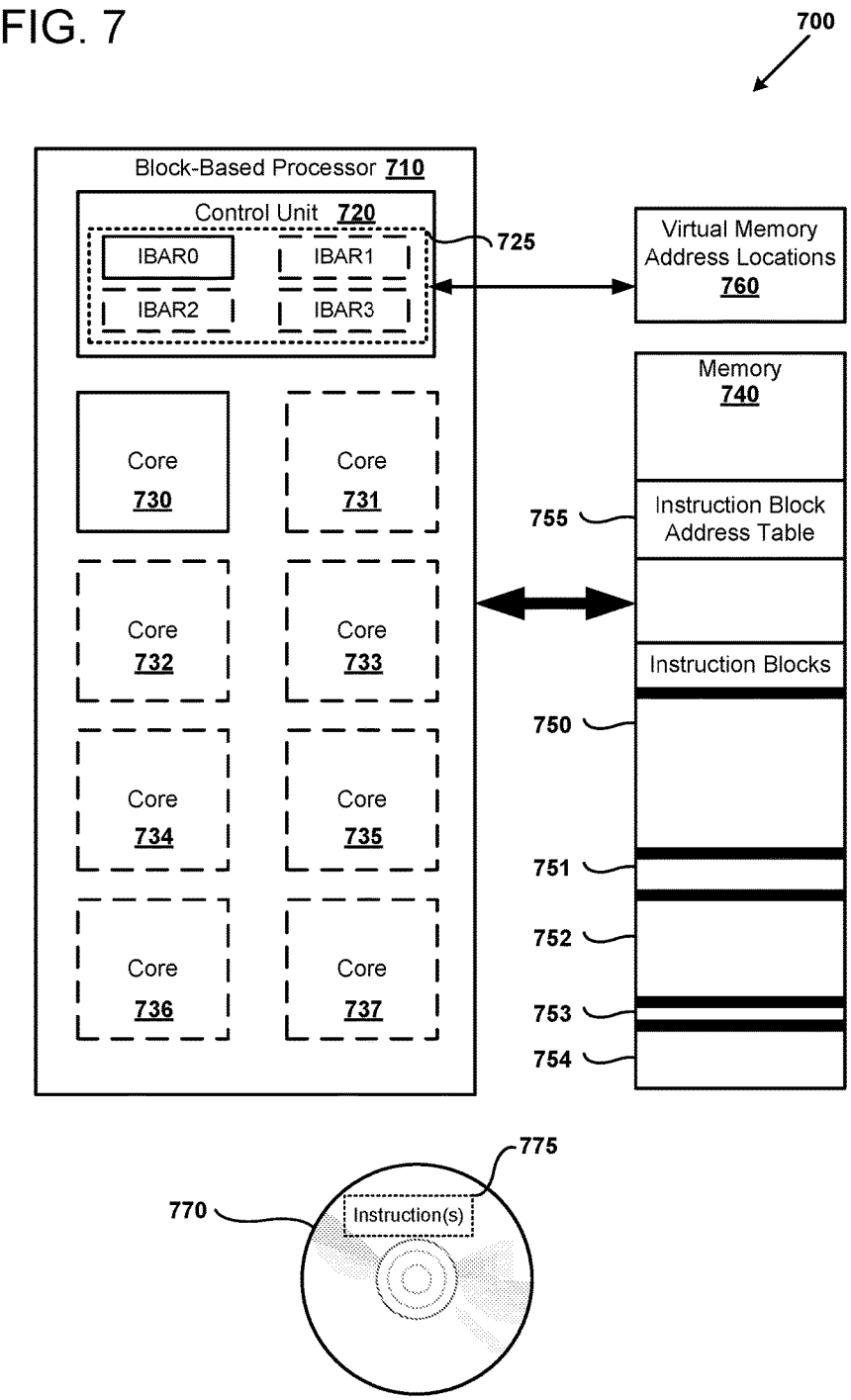
FIG. 7 illustrates a block-based processor configuration, as can be used in certain examples of the disclosed technology.

FIG. 7 is a diagram 700 illustrating an apparatus comprising a block-based processor 710, including a control unit 720 configured to execute instruction blocks including instructions for memory operations including memory synchronization and memory locks. The control unit 720 includes a core scheduler, which schedules the flow of instructions including allocation and de-allocation of cores for performing instruction processing, control of input data and output data between any of the cores, register files, memory interfaces and/or I/O interfaces. The control unit 720 also includes dedicated registers for performing certain memory operations.

The control unit 720 illustrated in FIG. 7 can include a plurality of one or more instruction block address registers 725 labeled IBAR0 through IBAR3. Each of the instruction block address registers 725 in the plurality can store a memory address for an instruction block entry point location that can be executed on any of the processor cores 730 through 737. In some examples, one or more of the instruction block address registers 725 can be read from and/or written to by sending load/store memory request to a number of designated virtual memory address locations 760. The processor memory interface is configured to catch loads and stores to designated virtual memory address locations in order to allow access to one or more of the instruction block registers. In some examples, the virtual memory address locations 760 can only be accessed when the processor is executing code in a supervisory or other privileged execution mode, but the virtual memory address locations cannot be accessed when the processor is in a user or other non-privileged execution mode. In some examples, target addresses used to calculate and change the address values stored in the instruction block address registers can be stored in an instruction block address table 755 which is stored in a distinct location in the memory 740 than the instruction blocks 750-754 as shown. In such examples, any of the processor cores configured to be in a privileged operating mode can store the memory address for the entry point to a virtual memory address in the instruction block address table 755, causing the memory address stored in the instruction block address register to be changed to the memory address stored to the virtual memory address. Similarly, any of the privileged operating mode cores can read the memory address for the entry point from a virtual memory address, causing the memory address stored in the instruction block address register to be read from the virtual memory address.

The block-based processor 710 also includes one or more processor cores 740-747 configured to fetch and execute instruction blocks. Each of the cores includes an instruction decoder that decodes instruction opcodes, extended opcodes, and other fields to determine whether an instruction specifies a variable number and/or type of target operands. The illustrated block-based processor 710 has up to eight processor cores 740-747, but in other examples there could be 64, 512, 1024, or other numbers of block-based processor cores. The block-based processor 710 is coupled to a memory 740 which includes a number of instruction blocks, including instruction blocks 750-754, and to a computer-readable storage media disc 770 that stores instructions 775 including block-based processor instructions for performing disclosed branch operations.

X. Example Source Code and Assembly Code Used with a Block-Based Processor

FIG. 8 illustrates an example of program code for a number of instruction blocks as can be compiled and executed by a block-based processor. A short portion of C language source code 810 is shown. The C code 810 includes a number of symbols, including a, z, and jump table, an if/else statement, a for loop, and a call made through the jump table. The C code 810 can be compiled by a suitable compiler for a block-based processor, to produce the illustrated assembly code 820.

The illustrated portion of assembly code 820 includes a number of labels: L0, L1, L2, and L3, each of which corresponds to the start of instruction block. Each instruction block has one or more associated exit points: block L0 has exit points for branch offset (BRO) instructions 4 and 5, block L1 has BRO instruction 2, block L2 has BRO instruction 4, and block L3 has CALL instruction 5 and BRO instruction 7. Upon speculative or non-speculative execution of a branch instruction associated with an exit point, a memory address is calculated and stored in an instruction block address register. For example, for a branch offset (BRO) instruction, the current value stored in the instruction block address register is added to the offset value encoded in the instruction, and stored in the instruction block address register. Negative offsets can be used by encoding a negative offset in the branch instruction.

Thus, the assembly code 820 is in condition to be mapped to machine code instructions for a block-based processor.

Figure 9:
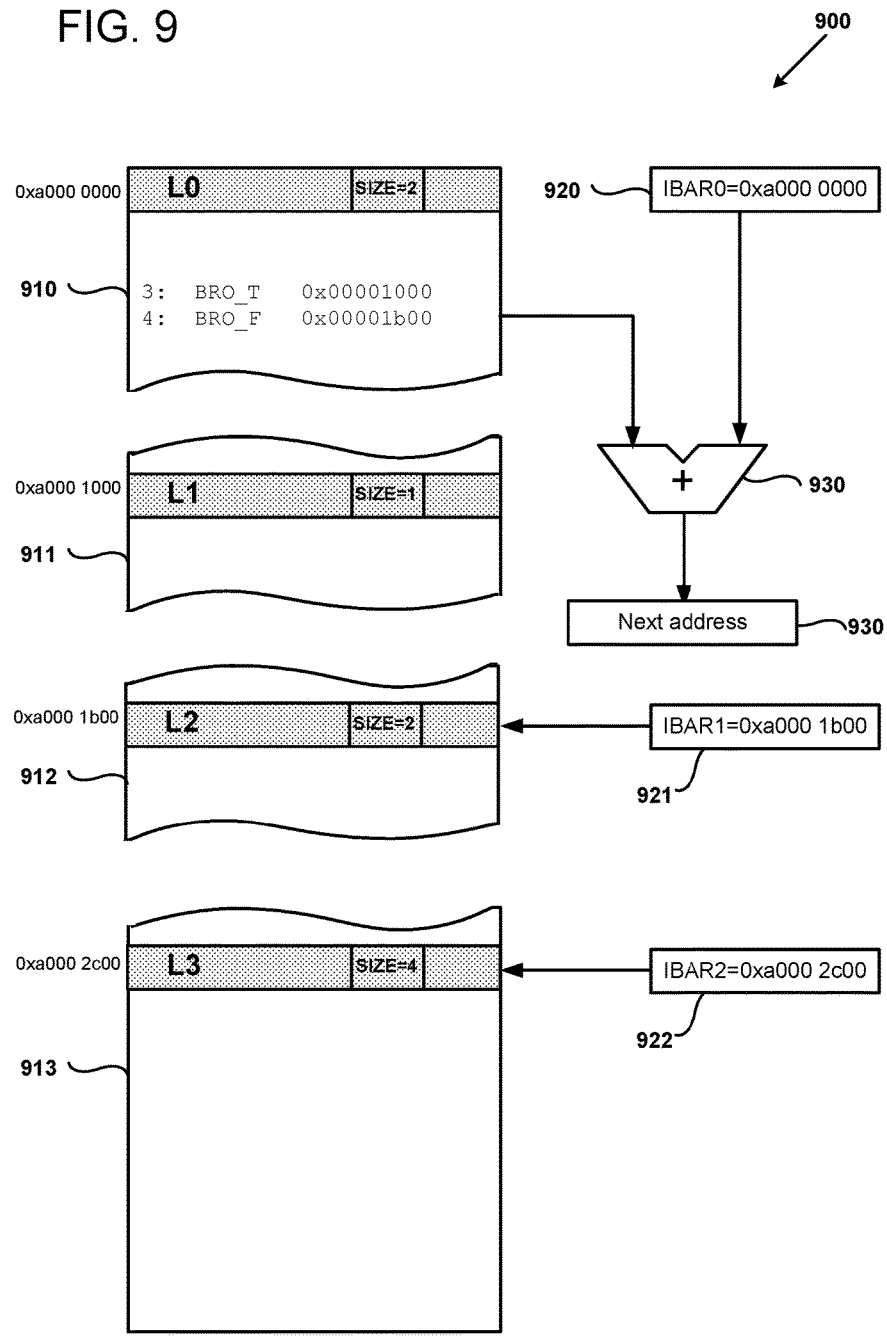
FIG. 9 is a diagram illustrating computation of addresses for an instruction block address register, according to certain examples of the disclosed technology.

XI. Example Generation of Entry Locations Using an Instruction Block Address Register FIG. 9 is a diagram 900 illustrating determination and use of instruction block address register during execution of instruction blocks 910-913 generated from the assembly code 820 discussed above regarding FIG. 8. As shown, the currently executing instruction block 910 is labeled L0 and has an entry point memory address location of 0xa00000000. This entry point location (in this example, the memory address of the first word of the instruction block header) of the instruction block is stored in one of the instruction block address registers, IBAR0 920. The instruction block 910 has two exit points: branch offset instruction 3, which is predicated on a true condition, and branch offset instruction 4, which is predicated on a false condition. The condition is the comparison of the variable a to the immediate value 97. Once the condition is evaluated and the exit point is determined, an offset value encoded in the corresponding branch instruction is combined with the current value of the instruction block address register and added to form the next address 930 for execution. In block-based processors that support speculative execution, the address can in some instances be determined prior to the condition being evaluated.

As part of performing the branch instruction, a control unit of the block-based processor can store the next address value 930 that was calculated into the instruction block address register (IBAR0). Further shown in FIG. 9 are two additional instruction block address registers, IBAR1 921 and IBAR2 922. These additional instruction block address registers can be used to fetch, decode, and execute instructions for instruction block L2 912 and instruction block L3 913 speculatively. For example, a branch prediction unit can be used to determine that the conditional of instruction block L0 910 is likely to evaluate to false, and thus branch instruction 4 is most likely to execute. The entry point of instruction block L2 can thus be calculated and stored in IBAR1 921 to allow early fetch, decode, and execution of the instruction block. Thus, the instruction block address register does not use a fixed size increment or decrement to calculate the next instruction address. Once an instruction block has been fetched and decoded, the instructions within the instruction block can execute in any order and thus the control unit does not directly access the instruction block address register in order to determine the location of individual instructions within the instruction block to execute. As the memory address stored in the instruction block address register does not change as the instruction block is executed, the block-based processor can execute a first instruction in an instruction block indexed by the instruction block register and execute a second, different instruction in the instruction block indexed by the instruction block register, without changing entry location to execute the first instruction and the second instruction.

Figure 10:
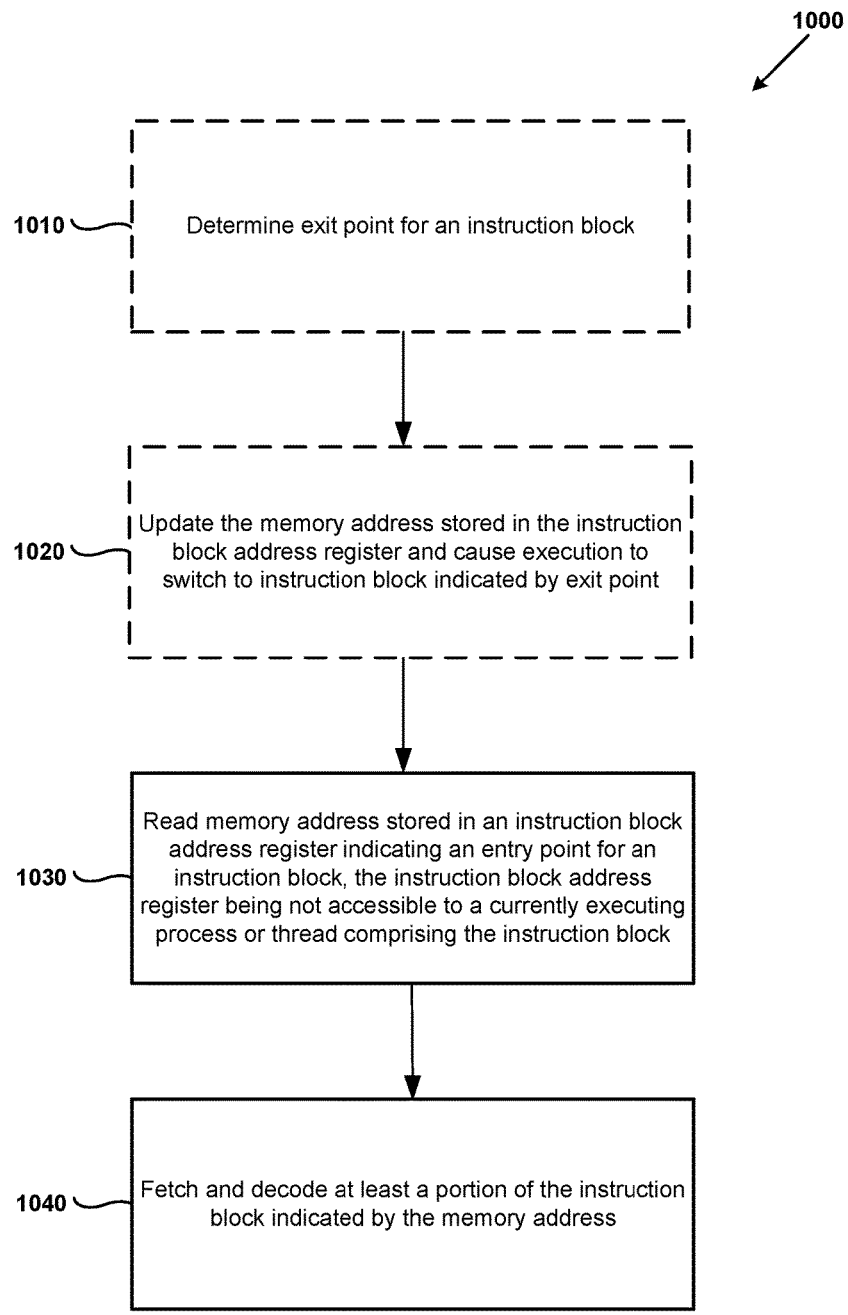
FIG. 10 is a flow chart outlining an example method of using an instruction block address register, as can be performed according to certain examples of the disclosed technology.

XII. Example Method of Operating a Block-Based Processor with an Instruction Block Address Register FIG. 10 is a flowchart 1000 outlining an example method of fetching and decoding instruction blocks using an instruction block address register, as can be performed in certain examples of the disclosed technology. For example, the block-based processors discussed above regarding FIG. 1 and FIG. 2 can be used to perform the depicted method, although other suitable block-based processors can be used to implement the method.

At process block 1010, an exit point for an instruction block is determined. Any suitable instruction that implicitly changes an instruction block address register can be used, for example: branch with offset (BRO), branch to a location specified by a target operand (BR), subroutine call instruction (CALL), system call instruction (SCALL), which is used to request special services from an operating system executing on the block-based processor, subroutine return instruction (RET), call with offset (CALLO), halt instruction (HALT), or any other suitable branch or jump instruction that changes an entry point for executing an instruction block. In some examples, one or more of the exit points of an instruction block can be determined implicitly. For example, by convention, if none of the other exit points of an instruction block are taken, then the execution flow can default to execute a next instruction located subsequently in memory, or default to execute a return instruction.

At process block 1020, a memory address determined for the exit point determined at process block 1010 is calculated and the instruction block address register is updated to store the calculated memory address value. For example, for a BR instruction, the input operand (ROP) is used as the target address, while for the BRO instruction, an offset value encoded in the instruction is added to the current value in the instruction block address register.

At process block 1030, a memory address stored in an instruction block address register indicating an entry point for an instruction block is read. The memory address indicates an entry point for an instruction block. The memory address and the instruction block address register are not accessible to the currently-executing process or thread comprising the instruction block. In other words, the currently-executing process or thread cannot determine the instruction block's address by, for example, using a processor instruction to access the instruction block address register. This can be desirable in many cases, in order to hide the memory location of the currently executing instruction block from the user process. By hiding the memory address, security of the processor is enhanced by making it more difficult to determine the memory address of the currently locating instruction block to prevent malicious changes to the code of the instruction block.

At process block 1040, at least a portion of the instruction block indicated by the new memory address stored in the instruction block address register at process block 1030 is fetched and decoded. In some examples, the instruction block is of variable length. The memory address stored in the instruction block address register does not need to change when executing instructions encoded in the instruction block. Thus, if the instruction block is relatively large, a large number of instructions can be fetched and decoded without performing a large number of changes and avoiding the associated overhead of such changes during execution of the instruction block. Thus, each instruction block acts as a single transactional packet and avoids the overhead associated with continually incrementing (or decrementing) program counters, as is done in traditional RISC or CISC processors. Thus, the control unit causes execution of the processor (or a current process or thread in multi-processor versions) to switch to the instruction block indicated by the exit point. Thus, the instruction block address register is updated, and instruction block headers and instructions can be fetched, decoded, and executed based on the determined exit point. A branch can be performed by executing a branch instruction encoded in an instruction block by changing the index address stored in the instruction block address register to a result value generated by the branch instruction. Hence, based on determining and exit point, the processor updates the memory address stored in the instruction block register and causes execution of the currently executing process or thread to switch to an instruction block indicated by the determined exit point.

XIII. Example Computing Environment

Figure 11:
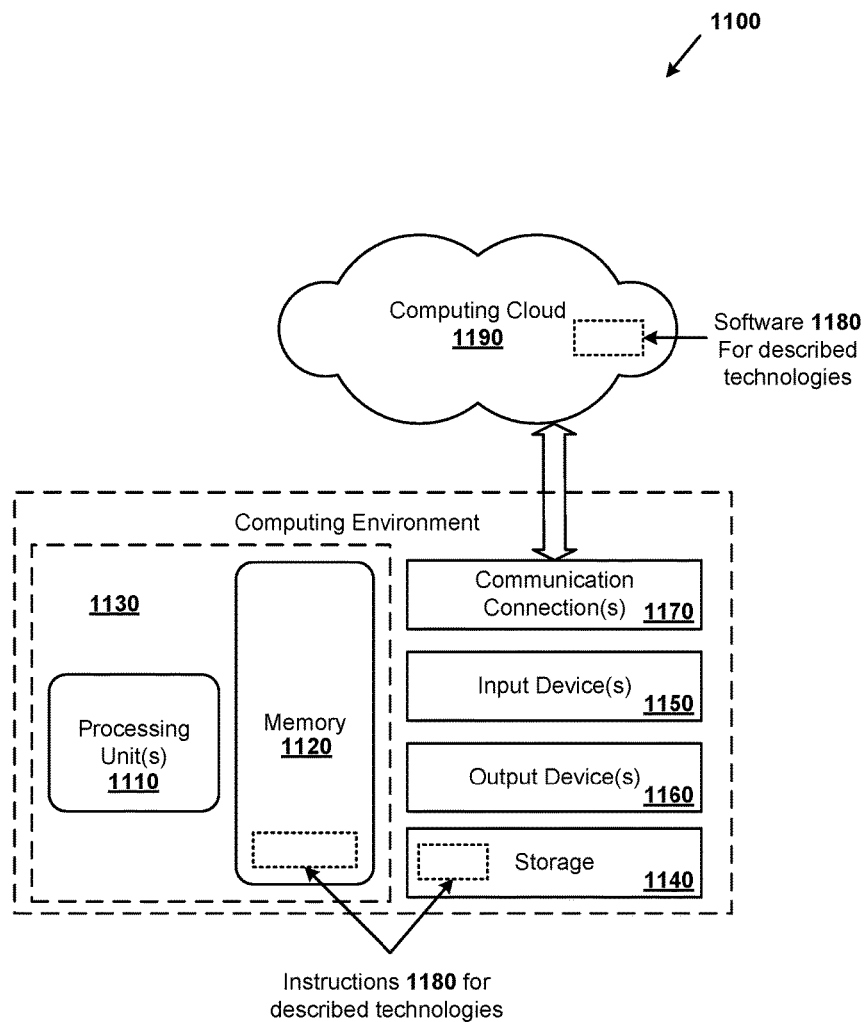
FIG. 11 is a block diagram illustrating a suitable computing environment for implementing some examples of the disclosed technology.

FIG. 11 illustrates a generalized example of a suitable computing environment 1100 in which described embodiments, techniques, and technologies, including configuring a block-based processor, can be implemented. For example, the computing environment 1100 can implement disclosed techniques for configuring a processor to perform disclosed operations with an instruction block address register.

The computing environment 1100 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions for block-based instruction blocks) may be located in both local and remote memory storage devices.

With reference to FIG. 11, the computing environment 1100 includes at least one block-based processing unit 1110 and memory 1120. In FIG. 11, this most basic configuration 1130 is included within a dashed line. The block-based processing unit 1110 executes computer-executable instructions and may be a real or a virtual processor. In a multi-processing system, multiple processing units execute computer-executable instructions to increase processing power and as such, multiple processors can be running simultaneously. The memory 1120 may be volatile memory (e.g., registers, cache, RAM), non-volatile memory (e.g., ROM, EEPROM, flash memory, etc.), or some combination of the two. The memory 1120 stores software 1180, images, and video that can, for example, implement the technologies described herein. A computing environment may have additional features. For example, the computing environment 1100 includes storage 1140, one or more input device(s) 1150, one or more output device(s) 1160, and one or more communication connection(s) 1170. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other medium which can be used to store information and that can be accessed within the computing environment 1100. The storage 1140 stores instructions for the software 1180, plugin data, and messages, which can be used to implement technologies described herein.

The input device(s) 1150 may be a touch input device, such as a keyboard, keypad, mouse, touch screen display, pen, or trackball, a voice input device, a scanning device, or another device, that provides input to the computing environment 1100. For audio, the input device(s) 1150 may be a sound card or similar device that accepts audio input in analog or digital form, or a CD-ROM reader that provides audio samples to the computing environment 1100. The output device(s) 1160 may be a display, printer, speaker, CD-writer, or another device that provides output from the computing environment 1100.

The communication connection(s) 1170 enable communication over a communication medium (e.g., a connecting network) to another computing entity. The communication medium conveys information such as computer-executable instructions, compressed graphics information, video, or other data in a modulated data signal. The communication connection(s) 1170 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed methods. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1190. For example, disclosed compilers and/or block-based-processor servers are located in the computing environment, or the disclosed compilers can be executed on servers located in the computing cloud 1190. In some examples, the disclosed compilers execute on traditional central processing units (e.g., RISC or CISC processors).

Computer-readable media are any available media that can be accessed within a computing environment 1100. By way of example, and not limitation, with the computing environment 1100, computer-readable media include memory 1120 and/or storage 1140. As should be readily understood, the term computer-readable storage media includes the media for data storage such as memory 1120 and storage 1140, and not transmission media such as modulated data signals.

XIV. Additional Examples of the Disclosed Technology

Additional examples of the disclosed subject matter are discussed herein in accordance with the examples discussed above.

In some examples of the disclosed technology, a block-based processor includes at least one processor core configured to fetch and execute instruction blocks with a plurality of execution units and a control unit comprising at least one instruction block address register that indexes an entry location for fetching an instruction block, the instruction block address register being implicitly written by executing a branch instruction with one of the execution units, the instruction block address register being not visible from one or more operating modes of the block-based processor. In some examples, the instruction blocks can be of variable size. In some examples, the instruction block address register is not incremented or decremented by execution of non-branch instructions within the instruction block. In some examples, the instruction block address register does not store an address of an instruction within the instruction block to be executed by the at least one processor core.

In some examples, the processor core is configured to execute a first instruction in the instruction block indexed by the instruction block register, and execute a second, different instruction in the instruction block indexed by the instruction block register, wherein the entry location does not change to execute the first instruction and the second instruction. Thus, all of the instructions in the instruction block can be executed without changing the index value stored in the instruction block register. In some examples, the control unit includes a plurality of two or more instruction block address registers, each respective instruction block register indexing an entry location for concurrently executing a respective instruction block with the block-based processor. In some examples, multi-processor, multi-threaded, and/or speculative operations can be performed using multiple instruction block address registers. In some examples, the control unit includes a plurality of instruction block address registers, each of one or more respective instruction block address registers indexing an entry location for speculatively executing a respective instruction block with the block-based processor. In some examples the block-based processor is implemented with a field programmable gate array, an application-specific integrated circuit, and/or an integrated circuit. In some examples, the block-based processor is emulated by another type of processor.

In some examples of the disclosed technology, an apparatus includes memory coupled to a block-based processor, and further includes an instruction block address register storing an index address to the memory storing a plurality of instructions for an instruction block, the indexed address being inaccessible when the processor is in one or more unprivileged operational modes (e.g., a user mode instead of a supervisor or hypervisor mode of processor operation), one or more execution units configured to execute instructions for the instruction block, and a control unit configured to fetch and decode two or more of the plurality of instructions from the memory based on the indexed address. In some examples, the instruction block is of variable length. In some examples, each of the plurality of instructions is executed without changing the index address stored in the instruction block address register. In some examples, the control unit is further configured to execute a branch instruction encoded in an instruction block by changing the index address stored in the instruction block address register to a result value generated by the branch instruction. In some examples, the apparatus or processor includes an additional one or more instruction block address registers, each of the instruction block address registers storing an index address to the memory for a respective instruction block to be speculatively fetched, decoded, and/or executed by the processor.

In some examples of the disclosed technology, a method of operating a block-based (e.g., an EDGE ISA processor) includes reading a memory address stored in an instruction block address register, the memory address indicating an entry point for an instruction block, the memory address and the instruction block address register being not accessible to a currently executing process or thread of the block-based processor comprising the instruction block, and fetching and decoding at least a portion of the instruction block indicated by the memory address. In some examples, the method includes executing two or more instructions encoded in the instruction block without changing the memory address stored in the instruction block address register. In some examples, the method includes determining an exit point for an instruction block, and based on the determining, updating the memory address stored in the instruction block register and causing execution of the currently executing process or thread to switch to an instruction block indicated by the determined exit point. In some examples the fetching and the decoding are based in part on a size field encoded for the instruction block. In some examples, the instruction block address register is accessible when the process or thread being executed by the processor is in a privileged mode of operation. In some examples, when the processor is configured to be in a privileged operating mode, the method further includes storing the memory address for the entry point to a virtual memory address, the storing causing the memory address stored in the instruction block address register to be changed to the memory address stored to the virtual memory address. In some examples, when the processor is configured to be in a privileged operating mode, the method includes reading the memory address for the entry point from a virtual memory address, the reading causing the memory address stored in the instruction block address register to be read from the virtual memory address.

In some examples, the method and processor use branch instructions to change the value stored in the instruction block address register. In some examples, other instructions can write to the instruction block address register. For example, when the processor is in a privileged (e.g., a supervisor or hypervisor) mode, normal register writing instructions (e.g., add, subtract, move, or other instructions that target a register) can target one or more of the instruction block address registers. In some examples, dedicated instructions for reading or writing to the instruction block address registers are provided that can be executed in privileged modes, but in unprivileged (e.g., user) modes.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. A block-based processor comprising:
 a control unit comprising at least one instruction block address register that indexes an entry location in a memory for fetching an instruction block, the instruction block address register being implicitly written by executing a branch instruction with one of the execution units, the instruction block address register being not visible from one or more operating modes of the block-based processor; and
 at least one processor core having a plurality of execution units and being configured to fetch and execute a first instruction of the instruction block from the memory at a location indexed by the instruction block address register and an incremental offset.

2. The processor of claim 1, wherein the instruction block can be of variable size.

3. The processor of claim 1, wherein the instruction block address register is not incremented or decremented by execution of non-branch instructions within the instruction block.

4. The processor of claim 1, wherein the instruction block address register does not store an address of an instruction within the instruction block to be executed by the at least one processor core.

5. The processor of claim 1, wherein the processor core is further configured to:

execute a second, different instruction in the instruction block indexed by the instruction block address register and an incremental offset, wherein the entry location does not change to execute the first instruction and the second instruction.

6. The processor of claim 1, wherein the control unit comprises a plurality of instruction block address registers, each respective instruction block register indexing an entry location for concurrently executing a respective instruction block with the block-based processor.

7. The processor of claim 1, wherein the control unit comprises a plurality of instruction block address registers, each of one or more respective instruction block address registers indexing an entry location for speculatively executing a respective instruction block with the block-based processor.

8. The processor of claim 1, wherein the block-based processor is implemented as at least one or more of the following: a field programmable gate array, an application-specific integrated circuit, or an integrated circuit.

9. An apparatus comprising memory coupled to a block-based processor, the apparatus comprising:
an instruction block address register storing an index address to the memory storing a plurality of instructions for an instruction block, the index address being inaccessible when the processor is in one or more unprivileged operational modes;
one or more execution units configured to execute instructions for the instruction block; and
a control unit configured to fetch and decode two or more of the plurality of instructions from the memory based on the indexed address and an incremental offset.

10. The apparatus of claim 9, wherein the instruction block is of variable length.

11. The apparatus of claim 9, wherein each of the plurality of instructions is executed without changing the index address stored in the instruction block address register.

12. The apparatus of claim 9, wherein the control unit is further configured to execute a branch instruction encoded in an instruction block by changing the index address stored in the instruction block address register to a result value generated by the branch instruction.

13. The apparatus of claim 9, further comprising an additional one or more instruction block address registers, each of the instruction block address registers storing an index address to the memory for a respective instruction block to be speculatively fetched, decoded, and/or executed by the processor.

14. The apparatus of claim 9, wherein the instruction block address register is not incremented or decremented by execution of non-branch instructions within the instruction block.

15. The apparatus of claim 9, wherein the control unit is implemented as at least one or more of the following: a field programmable gate array, an application-specific integrated circuit, or an integrated circuit.

16. A method of operating a block-based processor, the method comprising:
reading a memory address stored in an instruction block address register, the memory address indicating an entry point for an instruction block, the memory address and the instruction block address register being not accessible to a currently executing process or thread of the block-based processor comprising the instruction block; and
fetching and decoding at least two instructions of the instruction block indicated by the memory address by adding an incremental offset to the memory address.

17. The method of claim 16, further comprising executing two or more instructions encoded in the instruction block without changing the memory address stored in the instruction block address register.

18. The method of claim 16, further comprising:
determining an exit point for an instruction block; and
based on the determining, updating the memory address stored in the instruction block register and causing execution of the currently executing process or thread to switch to an instruction block indicated by the determined exit point.

19. The method of claim 16, further comprising: wherein the fetching and the decoding are based in part on a size field encoded for the instruction block.

20. The method of claim 16, wherein the instruction block address register is accessible when the process or thread being executed by the processor is in a privileged mode of operation.

21. The method of claim 16, further comprising, when the processor is configured to be in a privileged operating mode:
storing the memory address for the entry point to a virtual memory address, the storing causing the memory address stored in the instruction block address register to be changed to the memory address stored to the virtual memory address.

22. The method of claim 16, further comprising, when the processor is configured to be in a privileged operating mode:
reading the memory address for the entry point from a virtual memory address, the reading causing the memory address stored in the instruction block address register to be read from the virtual memory address.

* * * * *